(12) United States Patent
Kroon

(10) Patent No.: US 10,778,870 B2
(45) Date of Patent: Sep. 15, 2020

(54) BLACK GENERATION TO OPTIMIZE COLOR GAMUT VOLUME AND QUALITY WITHIN LIMITS ON COLORANT USAGE

(71) Applicant: Xerox Corporation, Norwalk, CT (US)

(72) Inventor: Stephen M. Kroon, Sherwood, OR (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 16/593,728

(22) Filed: Oct. 4, 2019

(65) Prior Publication Data

US 2020/0112652 A1 Apr. 9, 2020

Related U.S. Application Data

(60) Provisional application No. 62/741,796, filed on Oct. 5, 2018.

(51) Int. Cl.
*H04N 1/60* (2006.01)

(52) U.S. Cl.
CPC ......... *H04N 1/6008* (2013.01); *H04N 1/6072* (2013.01); *H04N 1/6075* (2013.01)

(58) Field of Classification Search
None
See application file for complete search history.

(56) References Cited

U.S. PATENT DOCUMENTS

| | | | |
|---|---|---|---|
| 7,050,627 B2 | 5/2006 | Cuciurean-Zapan et al. | |
| 7,602,537 B2 * | 10/2009 | Henley | H04N 1/6058 358/1.9 |
| 7,663,641 B2 * | 2/2010 | Sloan | H04N 1/60 345/589 |
| 8,009,325 B1 | 8/2011 | Borg | |
| 8,243,091 B2 * | 8/2012 | Kuno | H04N 1/6058 345/589 |
| 2005/0248784 A1 * | 11/2005 | Henley | H04N 1/6058 358/1.9 |
| 2005/0248785 A1 * | 11/2005 | Henley | H04N 1/6058 358/1.9 |
| 2006/0221396 A1 * | 10/2006 | Sloan | H04N 1/60 358/3.01 |
| 2015/0116738 A1 * | 4/2015 | Miyanaga | H04N 1/6008 358/1.9 |
| 2018/0191925 A1 * | 7/2018 | Stauder | H04N 9/67 |
| 2018/0324329 A1 * | 11/2018 | Thebault | H04N 1/6066 |
| 2020/0028991 A1 * | 1/2020 | Thebault | H04N 9/67 |

\* cited by examiner

*Primary Examiner* — Dung D Tran
(74) *Attorney, Agent, or Firm* — Fay Sharpe LLP

(57) ABSTRACT

A method for generating device-dependent color values which satisfy a colorant limit for an output device includes, for an input color defined by input values for three color channels in a first device-dependent color space, converting the input values to a hue angle $\theta$, a saturation S, and value V in a second device-dependent color space. Minimum, maximum and middle ones of the input values are identified. The minimum is set to zero and the middle adjusted to maintain the input hue angle. A hue leaf relating output colorant mixture to input color can be constructed for the hue angle, and partitioned into regions. The region of the hue leaf containing the input color is identified and interpolated to identify intermediate values for the input color in a third device-dependent color space, such as CMYK. Output values in the third device-dependent color are the intermediate values or values derived therefrom.

22 Claims, 14 Drawing Sheets

BLACK GENERATION TO OPTIMIZE COLOR GAMUT VOLUME AND QUALITY WITHIN LIMITS ON COLORANT USAGE

This application claims the benefit of U.S. Provisional Application Ser. No. 62/741,796, filed Oct. 5, 2018, entitled BLACK GENERATION TO OPTIMIZE COLOR GAMUT VOLUME AND QUALITY WITHIN LIMITS ON COLORANT USAGE, by Stephen M. Kroon, the disclosure of which is incorporated herein by reference in its entirety.

BACKGROUND

The exemplary embodiment relates to an apparatus and method for converting device-dependent three-channel input colors to four-channel output colors and finds particular application in computing black channel output values while conforming to limits on colorant usage.

Most color printers use combinations of colorants, such as inks or toners, for rendering images. These generally include subtractive primary colors cyan (C), magenta (M), and yellow (Y), and often a neutral color, typically black (K) color. The C, M and Y colorants define the printer's chromatic limits. When printed together in the correct device-specific ratio, C, M and Y can produce a neutral composite gray. However, this method for producing gray has several significant drawbacks including high ink use, high sensitivity to normal print process variation, poor color stability, low maximum density, muddy appearance, and lack of sharpness. To alleviate these problems, K is typically used in place of neutral combinations of C, M and Y to produce gray. Black colorant is also used to darken and stabilize dark shades and reduce total colorant use while increasing total color gamut volume. Printers use a variety of color transforms to convert device-dependent input color (usually three-channel RGB or CMY) to output device specific color, typically four-channel CMYK.

Replacing neutral combinations of C, M and Y with equivalent K can negatively affect some output colors. For example, depending on the output device, light near neutral colors often show more grain or noise after CMY replacement with K. Accordingly, algorithms have been developed to provide a balance between good color rendering and efficient use of colorants. Black generation algorithms generally differ, depending on the customer application, the printing technology and implementation specifics, including where, in the imaging/rasterization pipeline, the black channel is created. For example, in the case of aqueous and phase change ink jet printers using stochastic halftones, black channel generation may occur after rasterization on the bi-level bitmap as a point process. If, after halftoning to C, M and Y, the C, M and Y are all set to on, they are turned off and K is turned on. Variations in this general principle include retention of some under-color and neighborhood dependent processing.

In electro-photographic printers, black is often generated in continuous tone (contone) data before rasterization. Processes known as "under color removal" (UCR) and "gray component replacement" (GCR) are often used for this. UCR/GCR methods commonly involve examining the individual pixels of an image using the least (lightest) of the three cyan-magenta-yellow colors, often called the gray component, to determine an amount of black to be added (Gray Component Replacement). One or more of the CMY colors are then adjusted to account for the addition of black ink (Under Color Removal).

For example, the following CMY to CMYK conversion may be used:

$$\begin{bmatrix} K_{out} \\ C_{out} \\ M_{out} \\ Y_{out} \end{bmatrix} = \begin{bmatrix} klut[(\min(C_{in}, M_{in}, Y_{in}))] \\ clut[C_{in} - \min(C_{in}, M_{in}, Y_{in})] \\ mlut[M_{in} - \min(C_{in}, M_{in}, Y_{in})] \\ ylut[Y_{in} - \min(C_{in}, M_{in}, Y_{in})] \end{bmatrix}$$

where klut[ ], clut[ ], mlut[ ]and ylut[ ] are scalar tone reproduction functions/curves (TRC) implemented as look-up tables with interpolation, independently applied to each of K, C, M and Y. These curves are analogous to UCR/GCR curves used in the printing industry. In this simple algorithm UCR/GCR TRC curves together define the output gray line and determine ink use in composite colors.

One problem with this and similar black generation algorithms is the loss of output colors constructed using high chroma mixtures of CMY plus K. Additionally, demands for higher performance, consistency and lower operating costs have put pressure on printer developers to increase print speed and reduce and regularize colorant use. Manufacturers have developed variations in their algorithms and placed operating limits on printer components to address these needs. These changes include:

1. Limits placed on colorant usage, both explicitly, through specification changes, and implicitly, as limits formerly applied to raw engine output are now applied to linearized output.

2. Automatic color density control in the digital domain, further reducing total colorant usage.

3. Enforced mode-to-mode color matching limiting all modes to a common maximum chroma.

4. Limited or no ability for printer manufacturers to add controls to print engines supplied by third parties, including colorant formulation, engine embedded image processing or rasterization (e.g., halftoning) to mitigate or leverage what are otherwise device or consumable limitations.

For example, for a four-color printer where each colorant can be up to a maximum coverage of 100%, colorant ink limits were commonly set at 300% or more (i.e., at least about 75% of the theoretical maximum), based on raw/unlinearized engine response not including dot gain. Recently, limits ranging from about 240% to 280% have been applied. However, black generation algorithms designed for an ink limit of 300% with high dot gain do not perform as well when limited to total area coverage of 220% or less, for example. Using algorithms like the ones above, the only way to compensate for reduced ink in mid tones unavoidably adds composite color to the gray line, decreasing color stability and limiting the color gamut available.

There is a need for a black generation method designed to retain as much of the color gamut as possible within tight ink-limits while allowing configurable control of gray line composition, color stability, ink use and mixing.

INCORPORATION BY REFERENCE

The following references, the disclosures of which are incorporated herein by reference in their entireties, are mentioned:

U.S. Pat. No. 7,050,627, issued May 23, 2006, entitled BLACK COMPONENT GENERATION, by Cuciurean-Zapan, et al., describes a method for generating achromatic components for output. Input color data defined in a first color space is converted to intermediate color data defined in an intermediate color space. A black or achromatic component is computed and associated with the intermediate color data.

U.S. Pat. No. 8,009,325, issued Aug. 30, 2011, entitled CONTROLLING BLACK LEVELS USING A THREE DIMENSIONAL INTERMEDIATE COLOR SPACE, by Borg, describes a control method that includes identifying multiple preferred color values in a destination color space. Intermediate color values are defined in an intermediate color space with fewer color components. A mapping is defined from the destination color space to a source color space and the intermediate color values and the known mapping are used to determine a conversion process for converting source color values to preferred color values.

BRIEF DESCRIPTION

In accordance with one aspect of the exemplary embodiment, a method for generating device-dependent color values, which satisfy colorant limits for an output device, is described. For an input color defined by input values for respective color channels in a first device-dependent color space, the input values are converted to a second, cylindrical device-dependent color space (such as HSV, comprising a hue angle $\theta$, a saturation S, and a value V). The input values of the first device-dependent color space are ranked to identify a minimum one of the input values, a maximum one of the input values, and a middle one of the input values. The minimum input value is set to zero and the middle input value is adjusted to maintain the input hue angle. A hue leaf is constructed for hue angle $\theta$, based on output device reference colors corresponding to input color space coordinates at hue angle $\theta$. The hue leaf describes a slice of an output color gamut, which satisfies the colorant limit for the output device, the slice containing the input color. The hue leaf is partitioned into one or more regions, such as at least two regions. The region of the hue leaf containing the input color is identified. The identified region within the hue leaf is interpolated to identify intermediate values for the input color in a third device-dependent color space. The third device-dependent color space has a greater number of channels than the first device-dependent color space. Output values in the third device-dependent color space of at least four channels are output. The output values include the intermediate values or output values derived therefrom.

One or more of the steps of the method may be performed with a processor.

In accordance with another aspect of the exemplary embodiment, an image rendering system includes an intermediate color generator which, for each of a plurality of input colors defined by input values for respective color channels in a first device-dependent color space: converts the input values to a second, cylindrical, device-dependent color space; constructs a hue leaf based on the hue angle, the hue leaf describing a slice of an output color gamut which satisfies colorant limits for an output device, the slice containing the input color, the hue leaf being bounded by connected vertices for output device reference color values; partitions the hue leaf into interpolation regions, at least one of the interpolation regions having a non-zero size; identifies one of the interpolation regions of the hue leaf containing the input color; and interpolates the identified interpolation region within the hue leaf to identify intermediate values for the input color in a third device-dependent color space, the third device-dependent color space having a greater number of channels than the first device-dependent color space. An input device receives an image to be rendered, the image comprising a plurality of pixels, each pixel being defined by input values in the first device-dependent color space. An output device outputs output values for the pixel in the third device-dependent color space, the output values being the intermediate values or output values derived therefrom. A print engine receives the output values and renders the image using at least four colorants, based on the output values. The output device reference color values may be: W, K, D, $zK_\theta, Zk_\theta$, and $Z_\theta$, where: W corresponds to $\{S,V\}=\{0, 1\}$ in the device-dependent color space, K corresponds to maximum black colorant, D is the determined darkest neutral color composed of C, M, Y, and K colorants, where $C+M+Y+K \leq T$, where T represents the colorant limit, $Z_\theta$ corresponds to $\{S,V\}=\{1, 1\}$ in the second device-dependent color space at hue angle $\theta$, with the third color space value corresponding to input value ranked as maximum at maximum colorant, third color space value corresponding to input value ranked as minimum with no colorant and no black colorant and may be a maximum chroma point in the hue leaf at hue angle $\theta$, $zK_\theta$ is an output color with colorant mixture $Z_\theta$ plus as much of a mixture of Max and Mid in the ratio of $Z_\theta$ as possible up to $Z_\theta$ without exceeding the colorant limit T; $t(zK_\theta) \leq T$, and $Zk_\theta$ is an output color with colorant mixture $Z_\theta$ plus as much black colorant K as possible without exceeding the colorant limit T.

In accordance with another aspect of the exemplary embodiment, a method for generating device-dependent color values which satisfy a colorant limit for an output device includes, for an input color defined by input values for respective color channels in a first device-dependent color space, converting the input values to a hue angle $\theta$, a saturation S, and a brightness value V in a second device-dependent color space. A hue leaf is constructed, based on the hue angle, the hue leaf describing a slice of an output color gamut which satisfies the colorant limit for the output device, the slice containing the input color, the hue leaf being bounded by connected vertices for output device reference color values W, K, D, $zK_\theta, Zk_\theta$, and $Z_\theta$, where: W corresponds to $\{S,V\}=\{0,1\}$ in the second device-dependent color space, K corresponds to maximum black colorant, D is the determined darkest neutral color composed of C, M, Y, and K colorants, where $t(C)+t(M)+t(Y)+t(K) \leq T$, where T represents the colorant limit, $Z_\theta$ is a maximum chroma point in the hue leaf at hue angle $\theta$, $zK_\theta$ is an output color with colorant mixture $Z_\theta$ plus as much of a mixture of Max and Mid in the ratio of $Z_\theta$ as possible up to $Z_\theta$ without exceeding the colorant limit T; $t(zK_\theta) \leq T$, and $Zk_\theta$ is an output color with colorant mixture $Z_\theta$ plus as much black colorant K as possible without exceeding the colorant limit T. The hue leaf is partitioned into regions, at least one of the interpolation regions having a non-zero size, and the region of the hue leaf containing the input color is identified. The identified region within the hue leaf is interpolated to identify intermediate values for the input color in a third device-dependent color space, the third device-dependent color space having a greater number of channels than the first device-dependent color space. Output values in the third device-dependent color space are output, the output values being the intermediate values or output values derived therefrom.

One or more of the steps of the method may be performed with a processor.

Figure 8:
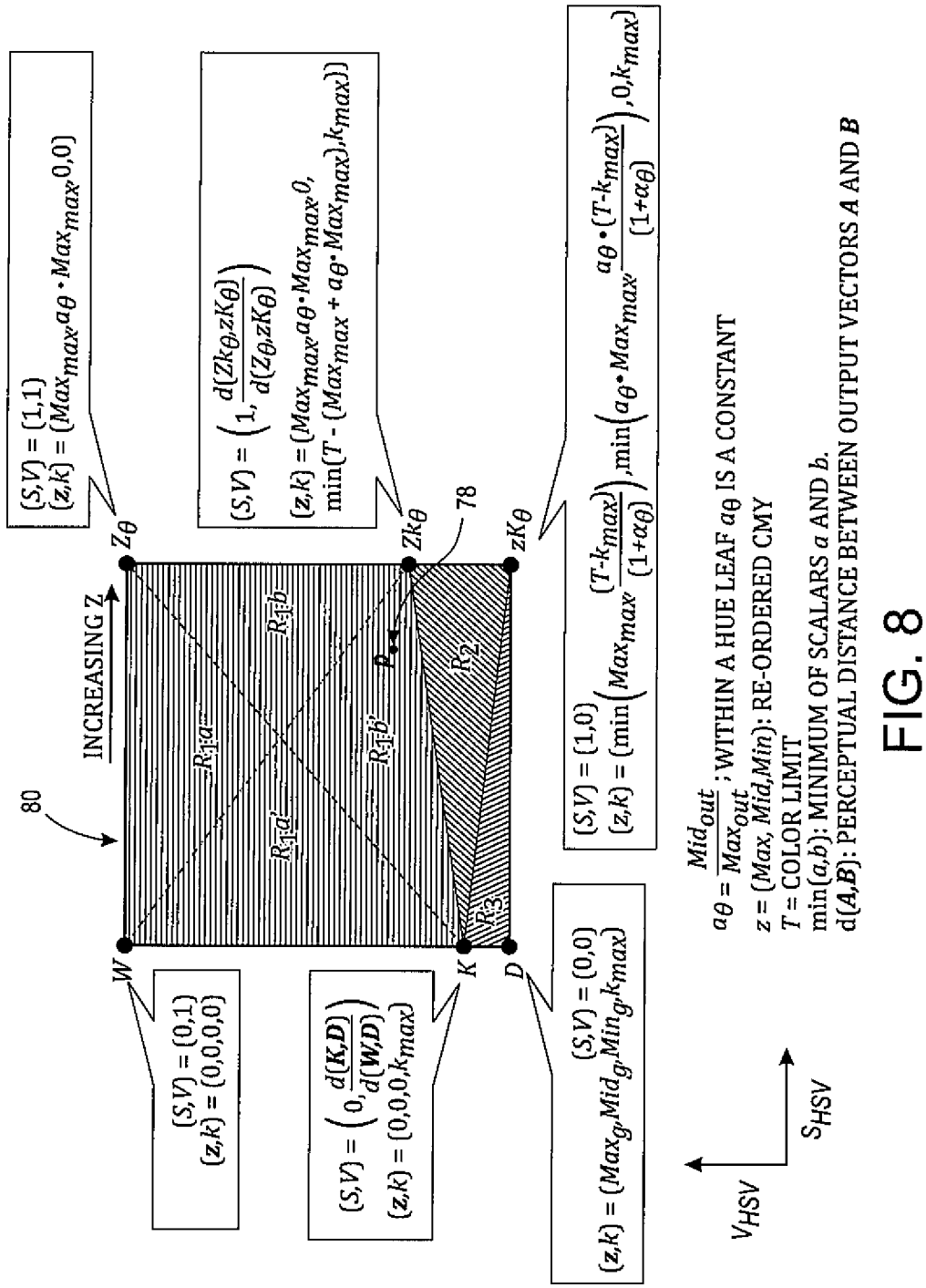
Figure 9:
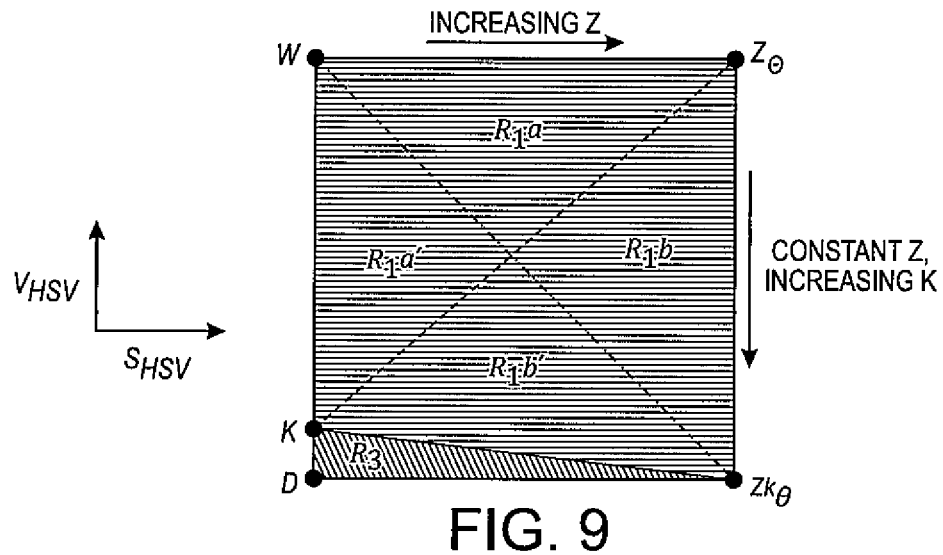
Figure 10:
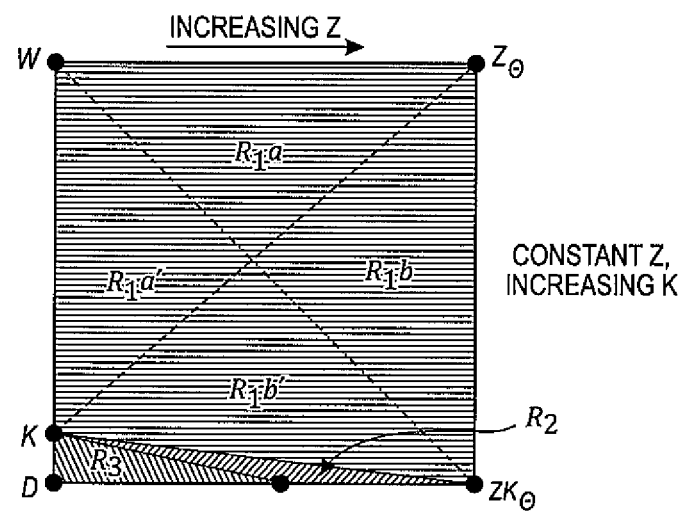
Figure 11:
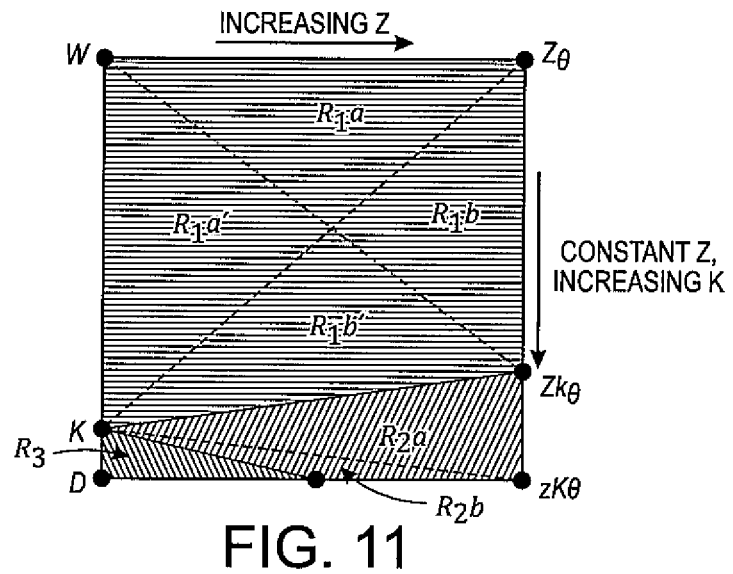
Figure 12:
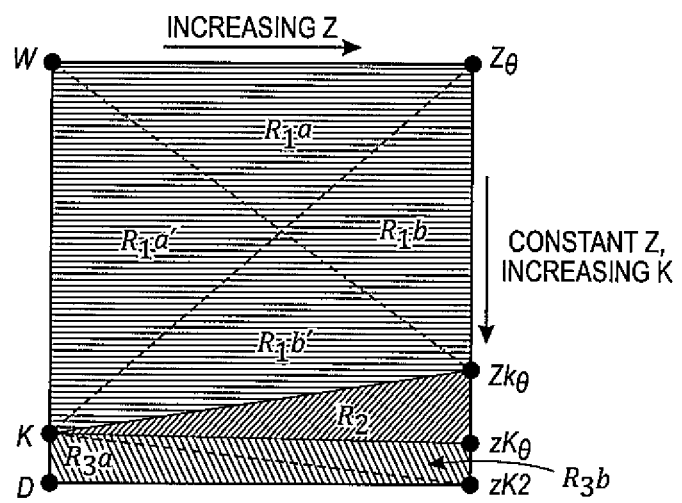
Figure 13:
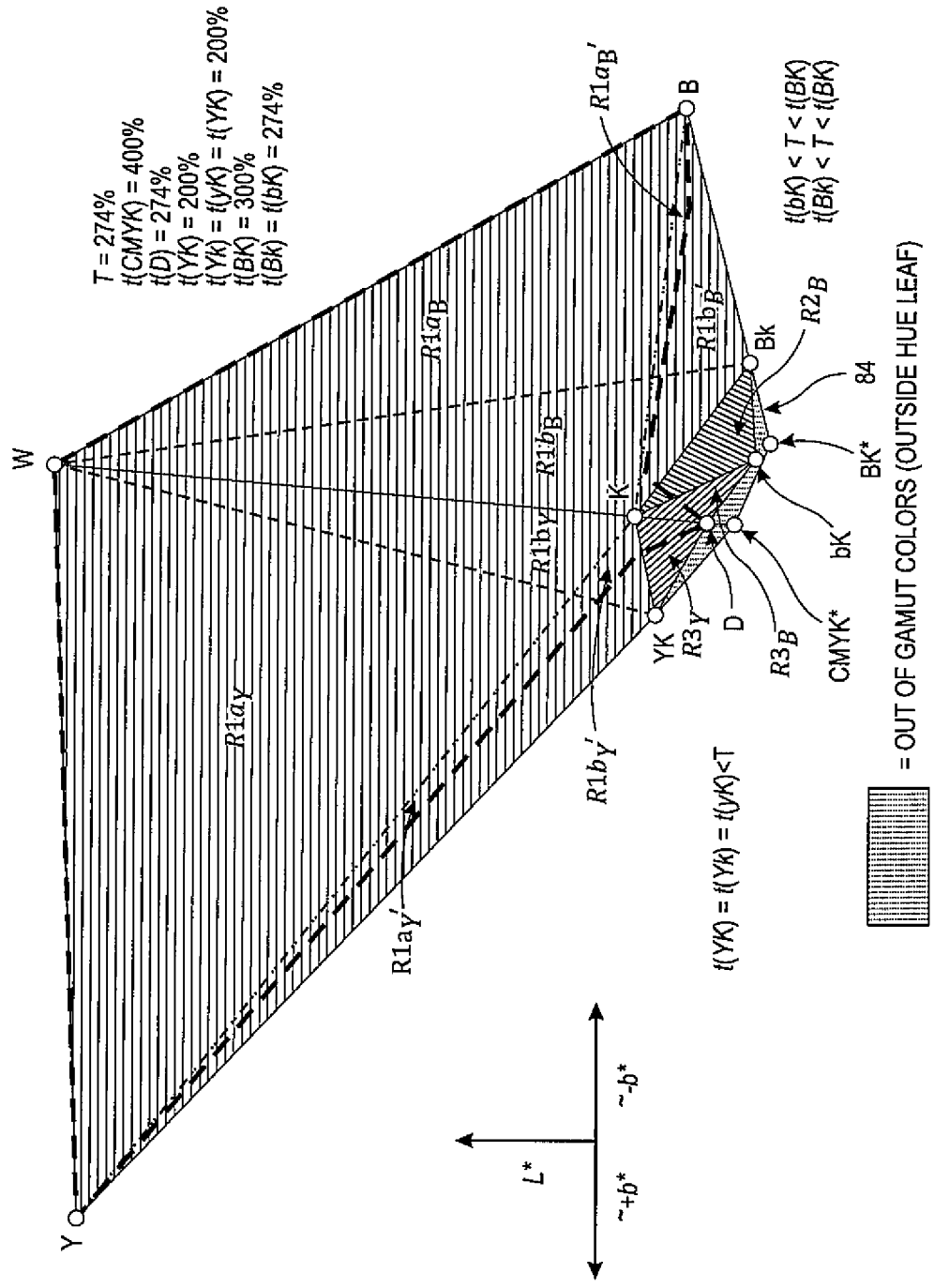
Figure 14:
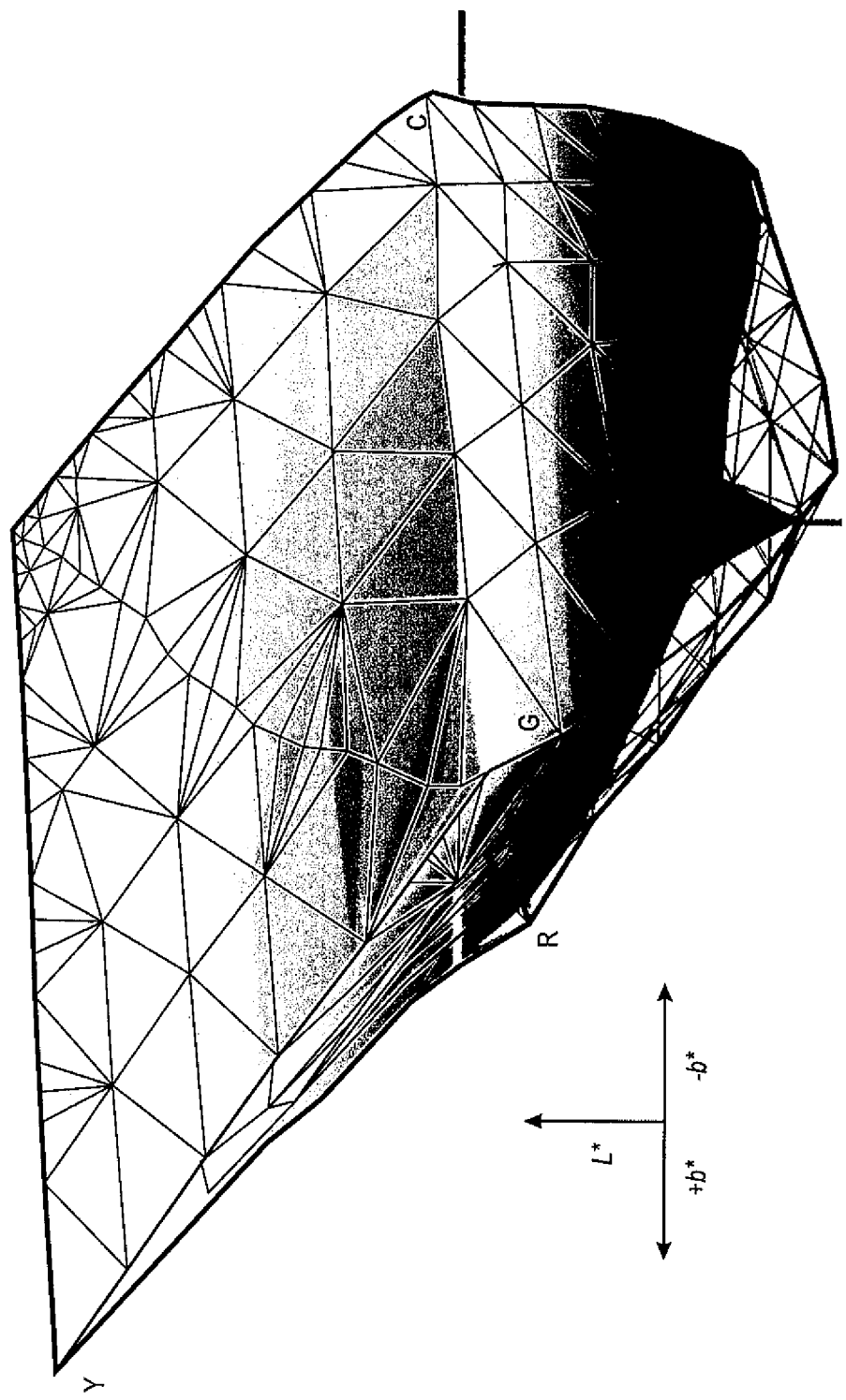
Figure 15:
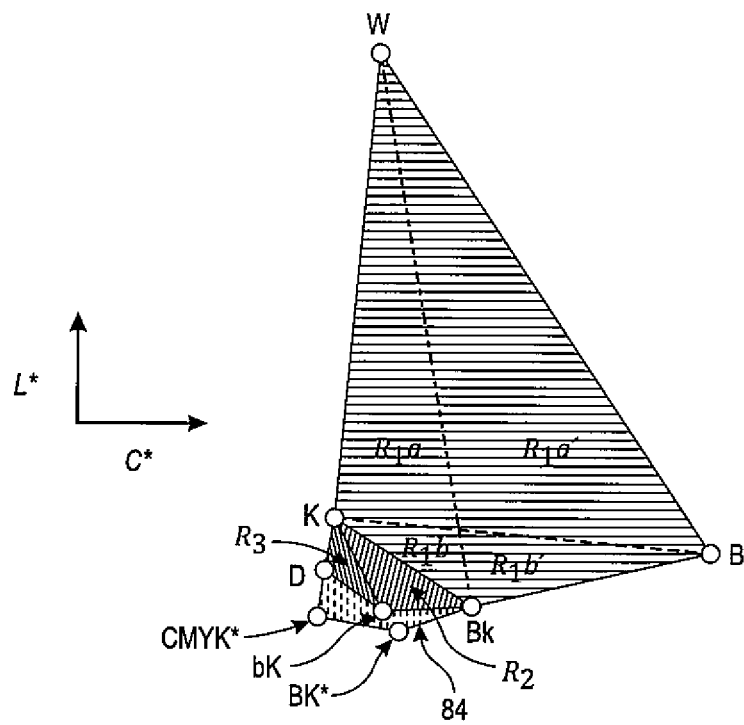
Figure 16:
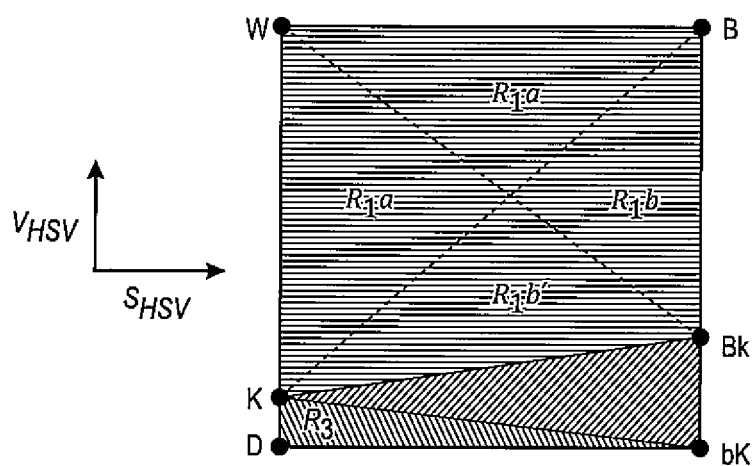
Figure 17:
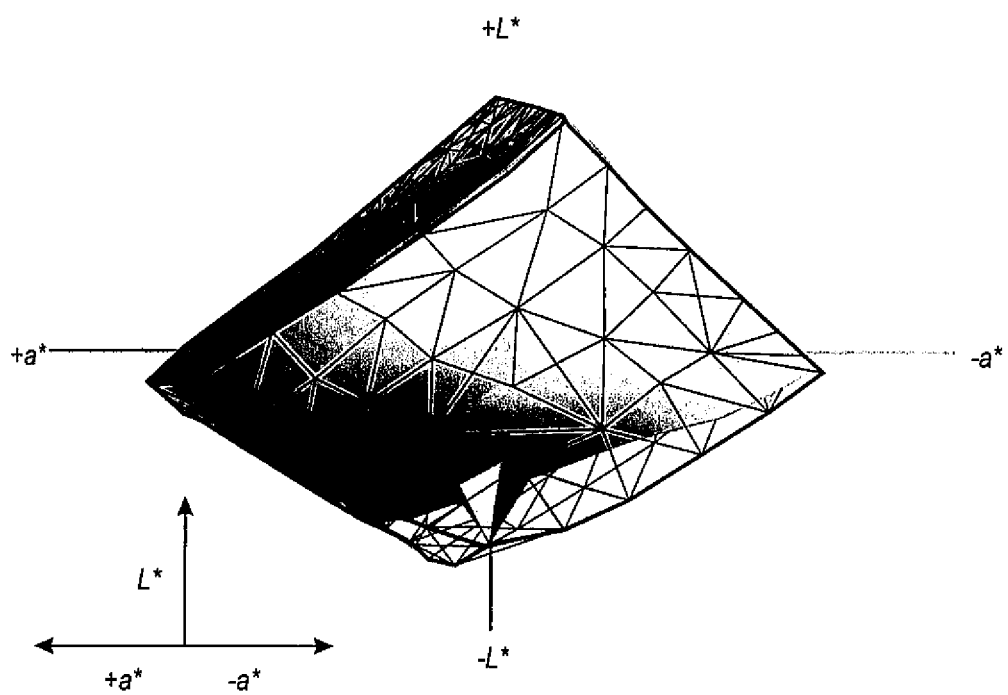

versus $H_{HSV}$ hue angle in degrees;

FIG. 8 illustrates an input hue leaf at hue angle θ on the ($S_{HSV}$, $V_{HSV}$) plane in cylindrical HSV color space, partitioned into interpolation regions annotated with input and intermediate output coordinates and formula for reference color values W, K, D, $zK_θ$, $Zk_θ$ and $Z_θ$ defining a hue leaf, FIG. 8 represents a hue with $t(Z_θ)+t(K)>T$ where output color $ZK_θ$ exceeds the colorant limit T placing it outside the output gamut with $zK_θ \neq Zk_θ$ so region 2 has an area greater than zero;

FIG. 9 represents an input hue leaf constructed using the formulation of FIG. 8 for a hue angle θ closer to a primary output color where $t(Z_θ)+t(K) \leq T$. In this case $ZK_θ$ is in gamut so $zK_θ=Zk_θ=ZK_θ$, thus eliminating (reducing to zero area) region 2;

FIGS. 10, 11 and 12 each represent different alternative hue leaf topologies to FIGS. 8 and 9;

FIG. 13 represents Yellow and Blue output reference colors for an example printer projected to the (L*, b*) plane in CIELAB D65 device-independent perceptual space. Approximate hue leaf shape, interpolation regions, out of gamut colors assuming colorant limit T=274% and approximate prior art hue leaf shape for comparison are also depicted;

FIG. 14 illustrates color gamut surfaces for an example printer plotted as an orthographic projection to the (L*, b*) plane in L*a*b* space from approximately the same perspective as the gamut slice represented in FIG. 13;

FIG. 15 illustrates a blue hue leaf with vertices in approximate relative positions in (L*, C*) representing perceptual lightness and chroma in CIELAB D65 perceptual color space. Note the concave irregular pentagon bounded by D, CMYK, BK Bk and bK at the bottom of FIG. 15 representing output device color exceeding the colorant limit T;

FIG. 16 illustrates output colors from FIG. 15, in their corresponding positions in input HSV space. Since color exceeding the colorant limit is not mapped, the output area bounded by D, CMYK, BK Bk and bK is not included; and FIG. 17 is an orthographic projection of the output gamut volume projected to the (L*, a*) plane in CIELAB and viewed from +b*, for the example printer comparing the conventional gamut volume (solid) with the gamut produced by the present method (wire frame).

DETAILED DESCRIPTION

An apparatus and method are described for black generation suitable for use in a device configured for color printing. The method aims to maximize the color gamut volume while obeying limits on colorant coverage that are substantially lower than the theoretical maximum coverage. As a result, improvements can be achieved in output device color without requiring hardware modifications or incurring performance costs. In the exemplary method, a two-stage conversion process is employed. In a first stage, three to four (or more) channel color conversion is performed. In a second, optional stage, black replacement is performed. For example, the first stage may include converting input values in a three-channel (device-dependent) color space (e.g., RGB) for each color used in an input image to three-channel values in a first (device-dependent) color space (e.g., CMY), denoted $C_{in}$, $M_{in}$, $Y_{in}$ and a device-dependent opponent representation in a second (device-dependent) cylindrical color space (e.g., HSV, with values denoted in cylindrical coordinates $H_{HSV}$, $S_{HSV}$, $V_{HSV}$ (or sometimes θ,S,V) or HSL, with values denoted in cylindrical coordinates $H_{HSL}$, $S_{HSL}$, $L_{HSL}$) and thereafter to four channel device-dependent intermediate values in a third (device-dependent) color space (e.g., CMYK), denoted $C_{int}$, $M_{int}$, $Y_{int}$, $K_{int}$, utilizing the maximum available color gamut and satisfying coverage limits, such as a total per-pixel coverage limit T for the output device which is to render the image. The conversion to HSV allows the mapping from CMY to CMYK to be split into hue (H) and hue leaf (SV) mappings. In the second, optional, stage, the four-channel, device-dependent (e.g., CMYK), intermediate magnitudes are converted to four-channel device-dependent output values (e.g., CMYK) in the third (device-dependent) color space, denoted $C_{out}$, $M_{out}$, $Y_{out}$, $K_{out}$. Where the second stage is omitted, $C_{int}$, $M_{int}$, $Y_{int}$, $K_{int}$ serve as $C_{out}$, $M_{out}$, $Y_{out}$, $K_{out}$. As will be appreciated, the method is not limited to a four-channel, third device-dependent color space, but could be used for five, six, or more output values. In general, the first and third color spaces overlap in at least three of their color channels (e.g., C, M, and Y), while differing in that the third color space includes at least one color channel (e.g., K), which is not in the first color space.

The method finds application in digital color output devices that include a redundant neutral colorant, such as digital CMYK printers, where the neutral colorant is K. Benefits of the method include a color gamut volume expansion under colorant usage limits. Results of an evaluation show a 9% gamut volume increase over a baseline method with noticeable gamut increase in the dark colored regions.

Figure 1:
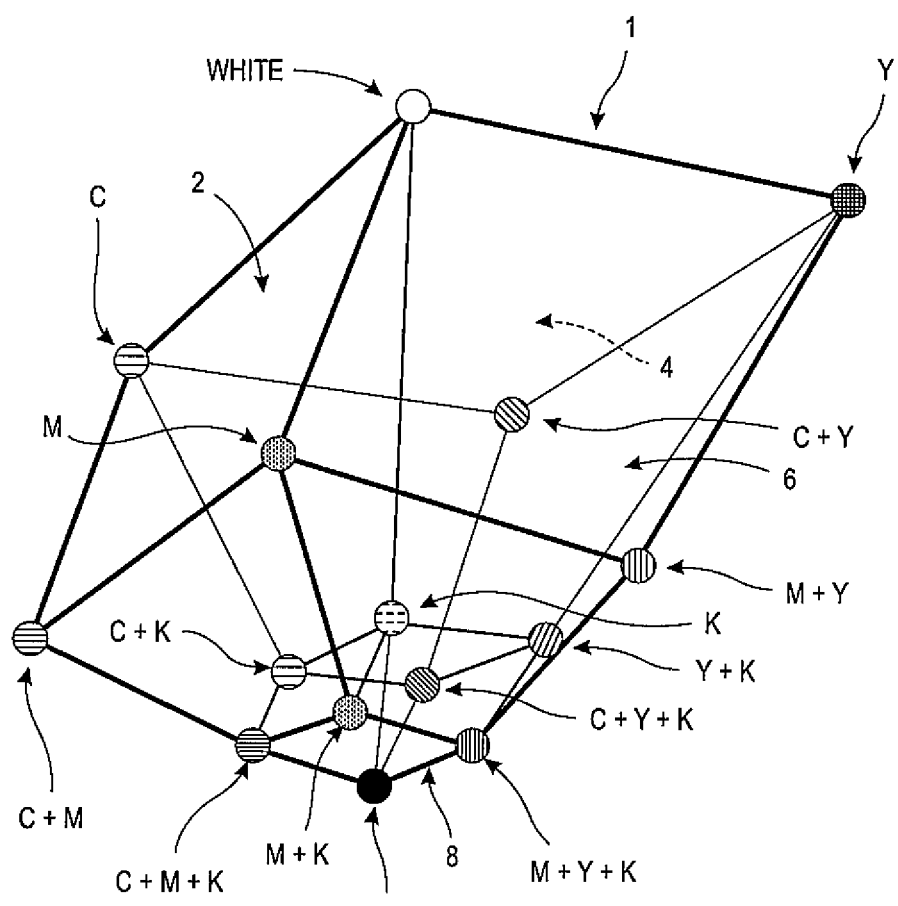
FIG. 1 is a qualitative representation of four 3D cuboid projections of a hypothetical 4D CMYK output device's color gamut with vertex positions corresponding to measured reference color positions in a perceptual (device-independent) opponent (CIELAB) color space with white (W) at the top and the darkest CMYK composite (D) at the bottom.
Figure 2:
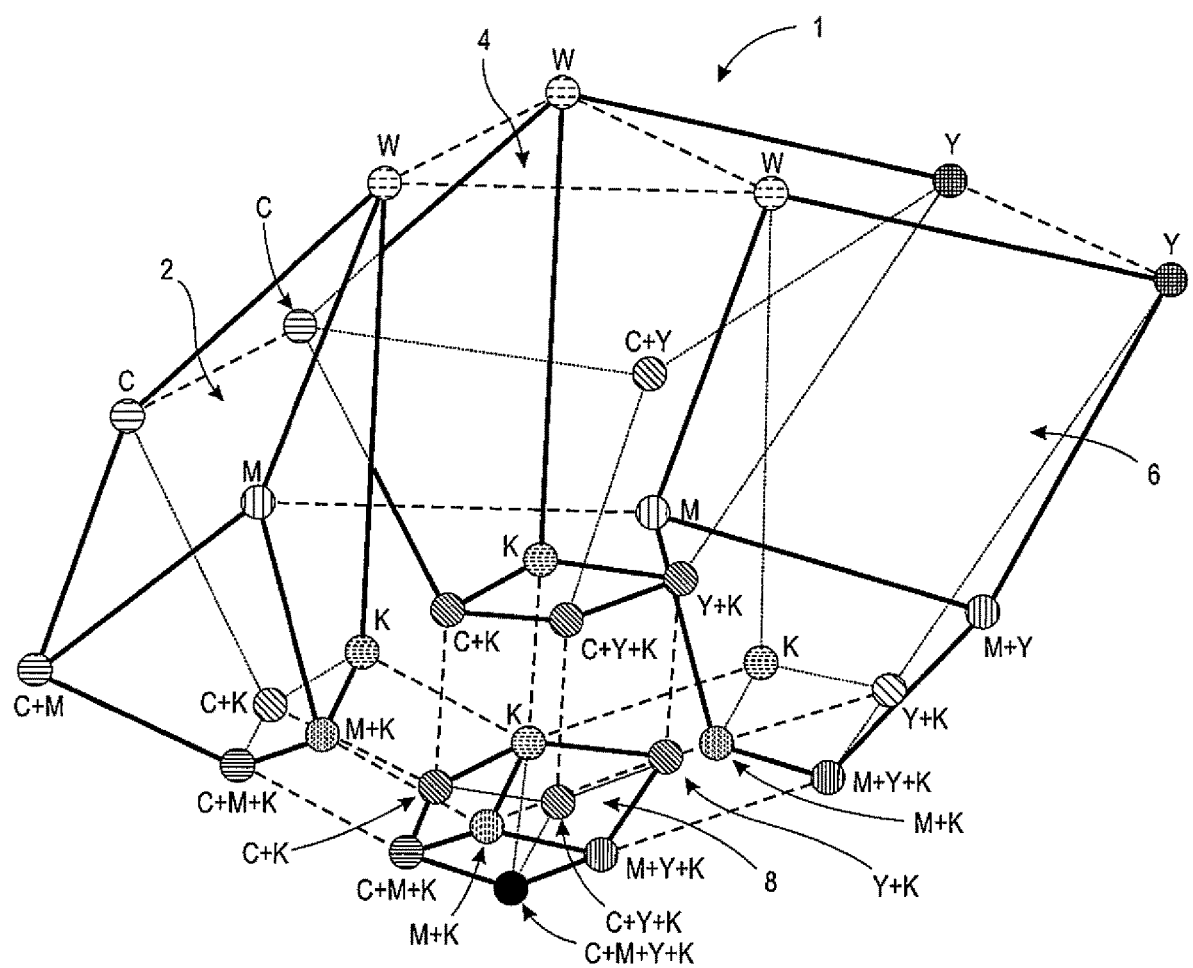
FIG. 2 is an exploded perspective view of the representation of FIG. 1.

As used herein, the term "color gamut volume" refers to the volume, in a three-dimensional (three-channel) perceptual color space (e.g., L*,a*,b*), of a representation of the color gamut of an output device, such as a color printer, which encompasses only the achievable color values. The representation may be composed from a set of three-dimensional structures, such as tetrahedra or projected rhomboids. For example, FIG. 1 is a qualitative representation 1 of the color gamut of a hypothetical four color CMYK output device, with vertices located according to their relative positions in a perceptual (device-independent) color space, such as CIELAB color space. In the representation, edges and surfaces connecting these vertices do not accurately represent perceivable color of the corresponding ink mixtures but are intended to suggest linear ink mixing and general partitioning of the volumes between vertices. Color gamut volume representation 1 consists of four 3D cuboid projections 2, 4, 6, 8 from the four color CMYK gamut, each projection having eight vertices, 12 edges, and 3 faces on the gamut surface. FIG. 2 shows these projections in exploded view. Cuboid 2 represents CMK with Y=0, cuboid 4 represents CYK with M=0, cuboid 6 represents MYK with C=0, and cuboid 8 represents CMY with K=$K_{max}$. The neutral color white, corresponding to C=M=Y=K=0, is shared by cuboids 2, 4 and 6. White, typically comprising no colorant, is shown at the top of representation 1. The CMYK composite using maximum colorant is at the bottom of cuboid 8, with all of C, M, Y and K at their respective maximum values (e.g., each 100%, with the composite often referred to as 400%). The value K=$K_{max}$ and C=M=Y=0 is at the top of cuboid 8 and is shared by all four projections. The maximum color gamut volume in perceptual space for a CMYK output device is usually equal to, or contained within, the volume defined by the union of these four 3D cuboid projections of the 4D CMYK output range. The four projected 3D volumes 2, 4, 6, 8 not only fill but also uniquely partition the maximum CMYK output gamut. The white to $K_{max}$ neutral color segment is shared by the three cuboids 2, 4, 6 with variable black levels. $K_{max}$ (typically K=1) is the lightest color in the CMY plus constant K cuboid 8.

Cuboid projections 2, 4 and 6 in FIGS. 1 and 2 use up to 300% ink and cuboid 8 uses from 100% up to 400% ink, when rendered. This may exceed typical device colorant limits, which are often substantially less than 300%. The present system and method aim to optimize the output gamut volume within the colorant limits defined for the specific printer model.

Figure 3:
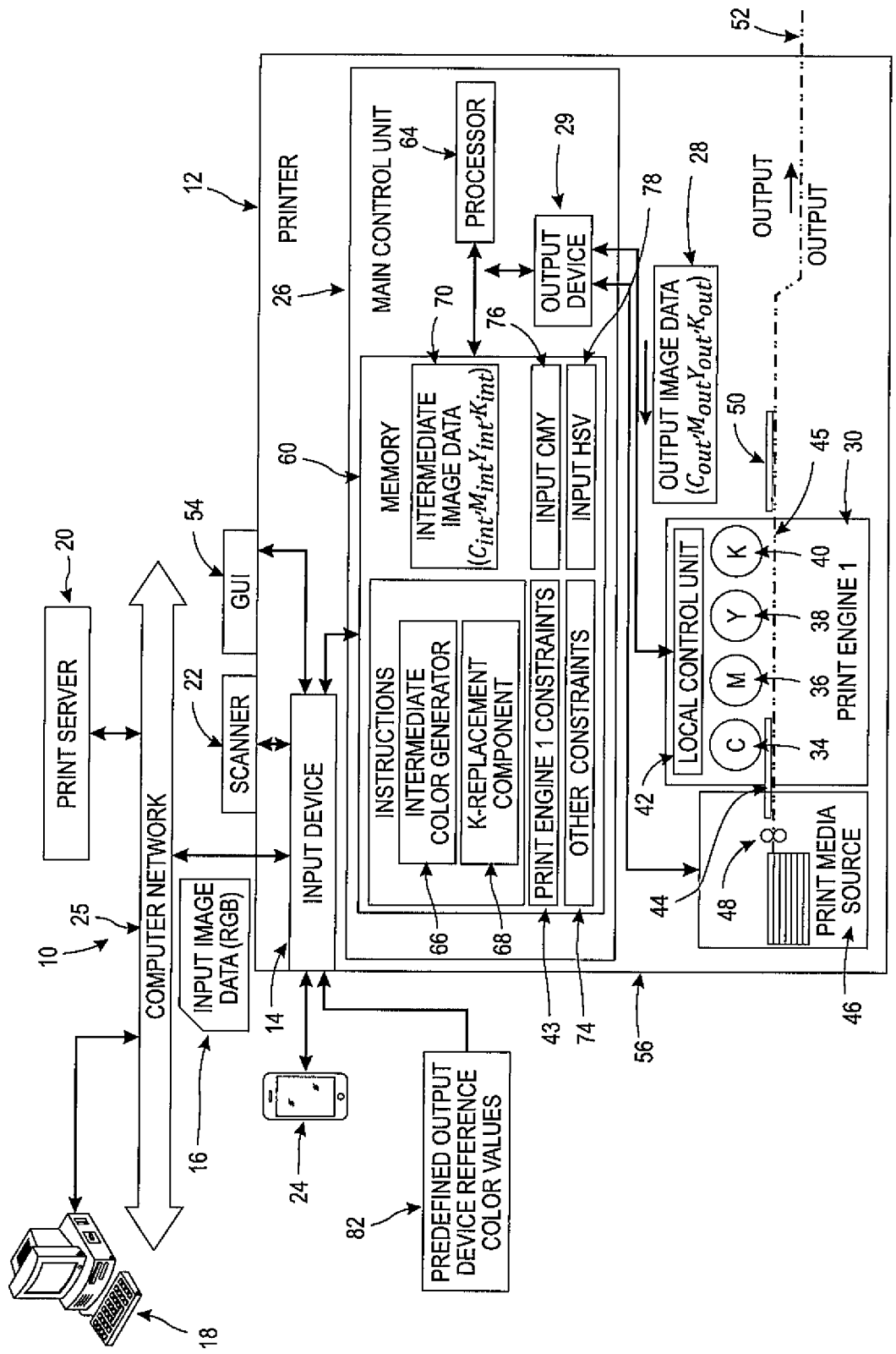
FIG. 3 is a functional block diagram of an image rendering system in accordance with one aspect of the exemplary embodiment.

FIG. 3 is a functional block diagram of a network image rendering system 10 suitable for implementing the black generation method described herein. The system 10 includes one or more image rendering devices, such as printers 12. The printer 12 includes an input device 14, which receives image data 16 for an image to be rendered. The input image data 16 may be defined in three color channels, such as RGB or CMY, although other three-channel color spaces are contemplated. In the following, the input image data for each pixel in the image may be referred to as ($R_{in}, G_{in}, B_{in}$). The input image data 16 may be received from one or more sources of image data, such as a personal computer 18, print server 20, scanner 22, or USB device 24, via one or more wired or wireless links, such as the illustrated computer network 25 or a direct link, in the case of a scanner or USB device. The input image data 16 is processed by a main control unit 26, which converts the input image data to output image data 28 defined in four (or more) color separations, such as CMYK ($C_{out}, M_{out}, Y_{out}, K_{out}$), i.e., converting the input to CMY and adding a black color channel in the exemplary embodiment. Each output channel corresponds to a respective one of the colorants employed in the printer 12. While the main control unit 26 is illustrated as being a part of the printer 16, some or all of the functions of the main control unit described herein may be performed elsewhere on the printing network 10, such as in the print server 20 and/or personal computer 18. In addition to performing the transformations from the input color to the output color space, the main control unit 26 may control various operations of the printer, as described below.

The output image data 28 in the third device-dependent color space ($C_{out}, M_{out}, Y_{out}, K_{out}$) is sent from an output device 29 of the main control unit to an image output device 30, such as a print engine. The exemplary print engine 30 renders the image on print media 32, using colorants 34, 36, 38, 40, one for each of the four color separations of the output image data 28. The colorants may be inks, in the case of an inkjet print engine, or toners, in the case of a xerographic print engine. The print engine 30 includes a local control unit 42, which may apply further processing to the output image data 28, such as applying one or more predefined constraints 43, e.g., constraint(s) on colorant limits, denoted T. These constraints 43 require that (or can be satisfied when) the constraint(s) is/are met for each of the pixels in the output image data 28. Where the printer includes more than one print engine with a different set of colorant constraints 43, the main control unit may store a respective set of constraints T for each print engine.

Print media 44, such as paper, card, or plastic, in sheet or roll form, or in the form of a three-dimensional object, is fed to the print engine 30, along a paper path 45. In particular, sheets are fed from a print media source 46, such as one or more paper trays, by a sheet transport system 48, such as a combination of sheet feeders, rollers, belts, air jets, or the like. After the sheet has been marked with the colorants in the print engine 30, and optionally fixing the resulting image with heat, other radiation, and/or pressure has been performed, the sheet transport system 48 conveys the printed media 50 downstream to an output device 52 of the printer, such as an output tray.

A user may provide input to the main control unit 26 and/or be provided with printing options, and the like, via a graphical user interface (GUI) 54. In some embodiments, the user may be presented with a choice among two or more printing modes, at least one of which is a printing mode which employs the exemplary black generation method, e.g., as part of a default mode. Typically, black generation underlies other built in color transforms in three-color input modes. It creates a "virtual" three-color output device designed to make best use of the real four-color device. There may be one or more three-color "raw" modes that use black generation by itself. These modes are used to create and apply three-color output device color profiles including custom color profiles.

While the physical components 14, 22, 26, 30, 46, 48, 52, 54 of the printer are shown in/supported by a common housing 56, other printer configurations are contemplated, such as modular printing systems. As will be appreciated, the printer 12 shown in FIG. 3 is only a simplified illustration and, in practice, may include other components than those shown.

The main control unit 26 includes memory 60, which stores software instructions 62 for computing the output image data 28, and a processor device 64, in communication with the memory, for executing the instructions. Specifically, the instructions 62 include an intermediate color generator 66 and optionally a selective black replacement component 68. The intermediate color generator 66 receives the three-channel input image data 16 (e.g., three color channels, such as RGB) and generates intermediate color data 70, in the form of four-color separations ($C_{int}, M_{int}, Y_{int}, K_{int}$) in the third device-dependent color space, based thereon, which satisfy the constraints 43 of the output device 30. The color separations for the intermediate color data 70 are in the same device-dependent color space (e.g., CMYK) as for the output color data 28 ($C_{out}, M_{out}, Y_{out}, K_{out}$). The values of the color separations in the intermediate color data 70 may be generated through any combination of lookup tables, algorithms, and/or other functions, as described in further detail in the method below. The optional selective black replacement component 68 performs selective exchange of the intermediate image data 70 with values for the fourth channel (K), which still satisfy the constraints 43 of the output device 30. The resulting image data may be output as the output image data 28 from the output device 29 of the main control unit. A data/control bus 72 may link hardware components 14, 29, 60, 64 of the main control unit 26.

The local control unit 42 may be similarly configured to the main control unit 26, i.e., with memory and a processor device. The local control unit 42 may be configured with proprietary software that enforces constraints such as the colorant limit(s) 43 on the output device 30, in at least one printing mode. In some embodiments, the user may be allowed to exceed the constraints 43 in a second printing mode, e.g., through selections on the GUI 54 or using a print interface located on a computer serving as a source 18, 24 of the image.

Figure 4:
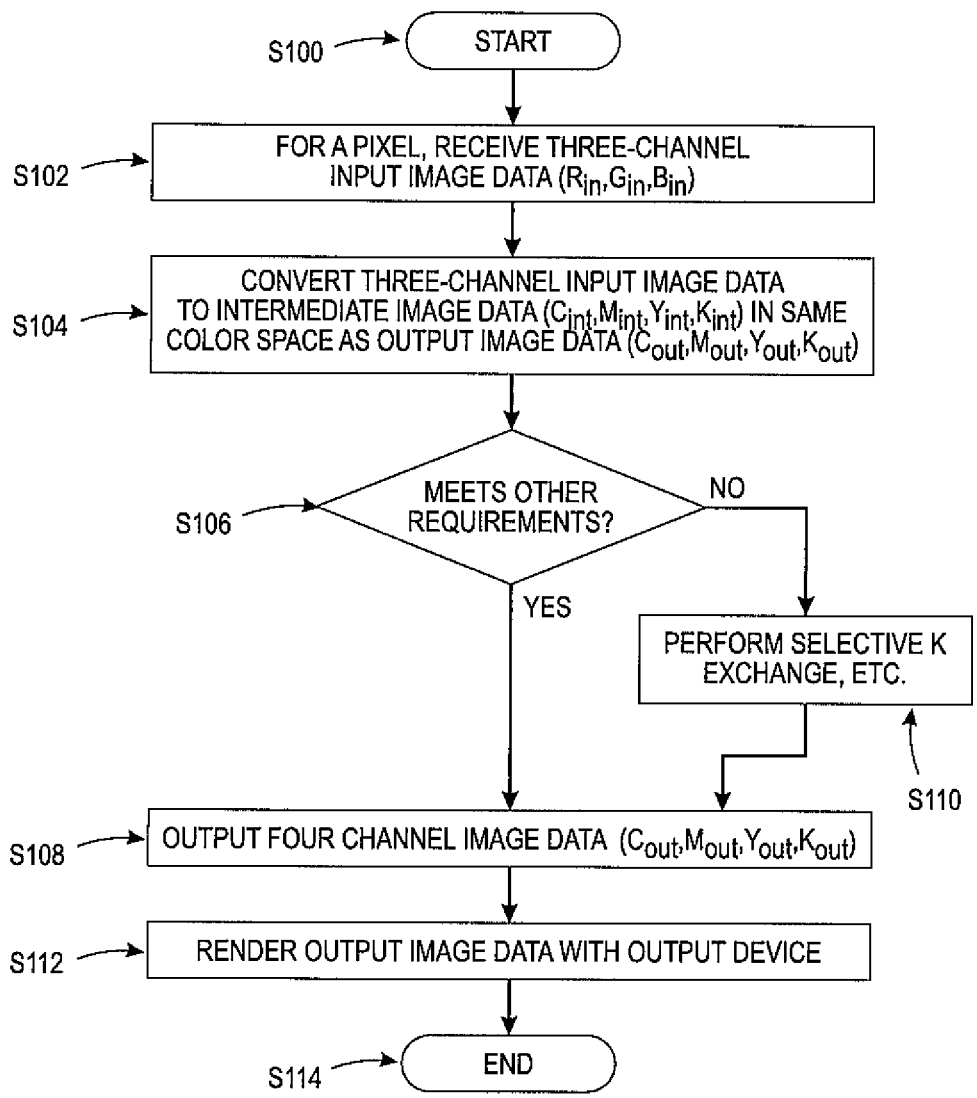
FIG. 4 is a flow chart illustrating an image rendering method in accordance with another aspect of the exemplary embodiment.

With reference to FIG. 4, a method of transforming three channel image data to four channel image data and printing an image, which may be performed with the apparatus of FIG. 3, is shown. The method begins at S100.

At S102, input color data 16 is received for an image or images to be printed. Each pixel of the input image 16 has an associated input color. Input color data is commonly encoded per pixel as a three-dimensional vector representing three additive or subtractive primary color channels.

At S104, the per-pixel three-channel device-dependent input image color data 16 (e.g., RGB or CMY, or other representation) is converted to four channel (e.g., CMYK) intermediate color data 70 in the third device-dependent color space, by the intermediate color generator 66. The three-channel to four-channel color conversion is performed to maximize the color gamut volume of the output device 30, within the arbitrary colorant limits 43 often enforced by the output device. The intermediate CMYK output 70 fills the maximum gamut within the arbitrary colorant limit(s) T, while also aiming to minimize non-black colorant use.

If at S106, the intermediate CMYK output 70 meets other output constraints and requirements 74 which may be imposed on the output (or if there are no other constraints or requirements), the method proceeds to S108, where the conversion process is complete and the intermediate CMYK output 70 may be output as the output image data 28.

If at S106, the intermediate CMYK output 70 does not meet the other constraints and requirements 74, the method proceeds to S110.

At S110, the intermediate CMYK output $(C_{int}, M_{int}, Y_{int}, K_{int})$ 70 may be modified while maintaining the output within the colorant limits 43, by the selective black replacement component 68. This is optionally used to control gray-line under-color and modify color texture by selectively exchanging K for equivalent mixtures of CMYK that are within the colorant limit T.

Selective black exchange is performed, for example, on the intermediate CMYK output 70. This includes selectively replacing some black colorant K in the intermediate image data 70 with perceptually similar CMY or CMYK colorant mixtures up to the colorant limit, depending on the requirements of the output device 30 and the input color relative to the output device color gamut as characterized in TABLE 1. Selective replacement may implement conventional user specifiable UCR/GCR gray-line replacement, control pixel-to-pixel brightness difference to trade off color texture and colorant use or achieve some other output device specific requirement. For example, if different output device or application trade-offs between ink use, color stability, output texture, and ink mixtures are required, these may be implemented in this step. Refinements applied in S110 may include, for example, replacement of black with an equivalent combination of C, M and Y to reduce output pixel-to-pixel brightness differences within halftones (most significant in yellow shades) or gray line replacement to match gray line under-color targets specified in conventional UCR/GCR look up tables. If these modifications are primarily applied to color within the output gamut with only limited or no application to the gamut surface, maximal gamut volume achieved at S104 may be retained.

For example, for each four-channel device-dependent intermediate color produced in S104, selective K exchange at S110 may return a modified four-channel output device color, also in the third device-dependent color space. In S110, the input $(C_{int}, M_{int}, Y_{int}, K_{int})$ for each pixel is converted to $(C_{out}, M_{out}, Y_{out}, K_{out})$, were $t(C_{out})+t(M_{out})+t(Y_{out})+t(K_{out}) \leq T$. Gray-line under-color may be implemented with a blend function exchanging K according to existing UCR/GCR curves on the gray-line, smoothly transitioning to no effect away from the gray-line (higher saturation color). The method may also exchange K for composite gray as a function of hue. For example, because the brightness difference between K and Y is relatively large, exchanging K in yellow hues for equivalent composite gray can improve output uniformity. Depending on product requirements, other weighted blends may be applied to selectively exchange K. The output device color reference values 82 may be used to guide K exchange/blend functions.

The method proceeds from S110 to S108, where the resulting CMYK image data 28 is output, e.g., to the output device 30.

At S112, the output image data 28 is received by the output device 30 and an image is rendered on print media 44, based thereon, using the colorants 34, 36, 38, 40.

The method ends at S114.

Further details on the system and method will now be described. Without intending to limit the scope of the exemplary embodiment, examples are provided as part of the description to illustrate generation and interpolation of hue leaves.

In the following, reference letters for vectors (i.e., more than one dimension/channel) are generally in bold and reference letters for scalar quantities are generally not bold. Lower case is generally used for less than a maximum value while upper case is generally used for a maximum value. Thus, for example, (Z,k) refers to maximum of vector Z, while k is a scalar value less than the maximum (in this case, the maximum value is referred to as K or $K_{max}$ rather than K, to distinguish from K used generally to represent the color black). The subscript $_\theta$ is used to denote the hue angle. Thus, $Z_\theta$ denotes the maximum value of vector Z at a specific hue angle. As will be appreciated, while 50% M, for example, is treated, for convenience, as a scalar (0.5 magenta), it could also be considered as a vector CMY (0, 0.5, 0) or vector CMYK (0, 0.5, 0, 0).

Output Device Colorant Constrains

For the output device 30, it is assumed that at least one colorant constraint T 43 on the output color, is known. The function t(A) returns the total colorant used by a color vector A. T is a per-pixel limit on the sum of output C, M, Y and K channel colorant use, such that $t(C_{out})+t(M_{out})+t(Y_{out})+t(K_{out}) \leq T$. More generally, if the maximum colorant per channel is 100%, T may range from 0 to N×100% where N is the number of output channels. Value T typically represents the total area coverage limit established by the output device manufacturer. For example, T≤274%, used for examples described herein, is typical and substantially lower than the sum of the maximum colorant per channel, which is 400% (C+M+Y+K) in a four colorant output device where up to 100% of each primary may be specified as illustrated in FIG. 1 and FIG. 2.

Three to Four Channel Color Conversion

Figure 5:
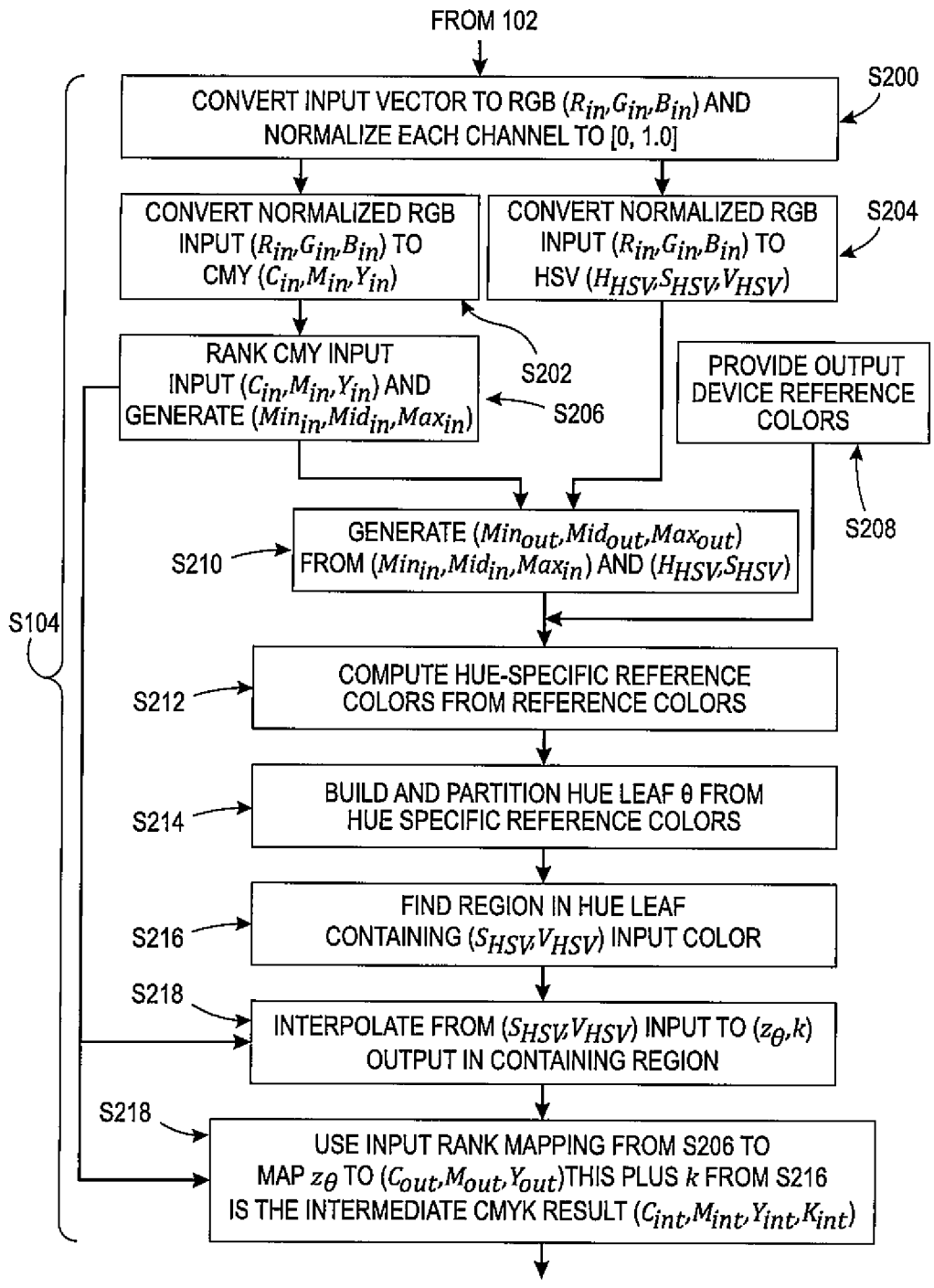
FIG. 5 is a flow chart illustrating a first stage in the conversion of three-channel input color data to four-channel output color data in the image rendering method of FIG. 4.

Step S104 of the method shown in FIG. 4 may proceed as shown in FIG. 5. For each three-channel input signal ($R_{in}$, $G_{in}$, $B_{in}$), this step returns a four-channel output device color ($C_{int}$, $M_{int}$, $Y_{int}$, $K_{int}$) in the third device-dependent color space. In the following, an RGB input of R=207, G=109, B=34 is used as an example, where each channel ranges from 0 to a maximum of 255.

At S200 an image pixel is received as a three-channel vector. In this example, the vector represents the color of a single input image pixel but could alternatively, for example, represent the input color of a node in a lookup table. Each channel in the color vector is normalized to ∈[0, 1.0], i.e., all input values are normalized to the range 0 to 1. For RGB values expressed in the range [0,255], this may include dividing non-zero values by 255. Thus, for the example input: $R_{in}$=0.81, $G_{in}$=0.43, $B_{in}$=0.13. This step may be omitted if the input color values are already RGB and normalized.

At S202, the normalized three-channel input color is converted to input values in the first device-dependent color space, e.g., CMY input values ($C_{in}$, $M_{in}$, $Y_{in}$) 76. As an example, if the input color is in RGB format, it may be converted to CMY using: $C_{in}$=1−$R_{in}$; $M_{in}$=1−$G_{in}$; $Y_{in}$=1−$B_{in}$. As will be appreciated, if the input color is already expressed as CMY values in the range of 0-1, this step may be omitted. Thus, for the example input, $C_{in}$=0.19, $M_{in}$=0.57, $Y_{in}$=0.87. The result of steps S200 and S202 is thus a regularized device-dependent input vector 76 ($C_{in}$, $M_{in}$, $Y_{in}$). As will be appreciated, the computations performed in S200 and S202 can be combined into a single step.

At S204, the normalized three-channel input color is also converted to cylindrical coordinates in a second, device-dependent color space that includes a hue component, such as HSV (Hue, Saturation, Value) as exemplified herein, or, with appropriate adjustment of topological assumptions, HSL (hue, saturation, lightness), or other cylindrical device-dependent color space may be used to represent the normalized input color. This allows Hue (H) to be processed independently of Saturation (S) and Value (V). In HSV space C, M and Y hue angles are defined as 180°, 300° and 60°, respectively with magnitudes normalized to [0, 1]. S∈[0,1] and] V∈[0, 1]. For example, an input HSV color vector 78 is computed from ($R_{in}$, $G_{in}$, $B_{in}$) or from ($C_{in}$, $M_{in}$, $Y_{in}$). The computation of the HSV input vector 78 can be based on the normalized input RGB values ($R_{in}$, $G_{in}$, $B_{in}$). A suitable method for computing cylindrical HSV values from RGB values is described in Wikipedia (see https://en.wikipedia.org/wiki/HSL_and_HSV). For $H_{HSV}$, the method entails computing the angle subtended by the input vector 76 in a plane that is perpendicular to the neutral axis (black to white).

$$\mathcal{M} = \max(R_{in}, G_{in}, B_{in})$$

$$\mathit{m} = \min(R_{in}, G_{in}, B_{in})$$

$$\mathcal{C} = \mathcal{M} - \mathit{m}$$

$$H(\text{in degrees}) = 60° \times \begin{cases} \text{undefined, if } \mathcal{C} = 0 \\ \frac{G_{in} - B_{in}}{\mathcal{C}} \bmod 6, \text{ if } \mathcal{M} = R_{in} \\ \frac{B_{in} - R_{in}}{\mathcal{C}} + 2, \text{ if } \mathcal{M} = G_{in} \\ \frac{R_{in} - G_{in}}{\mathcal{C}} + 4, \text{ if } \mathcal{M} = B_{in} \end{cases}$$

(If H is negative, add 360).

Then $V_{HSV}$ and $S_{HSV}$ are defined as follows:

$$V_{HSV} = \mathcal{M}$$

$$S_{HSV} = \frac{\mathcal{C}}{V_{HSV}}$$

This differs slightly from the standard definition for HSV, which sets S=0 when V=0. In the example input, $R_{in}$=0.81 is the maximum value ($\mathcal{M}$) and $B_{in}$=0.13 is the minimum ($\mathit{m}$). Thus, $$\mathcal{M} = 0.81, \mathit{m} = 0.13, \mathcal{C} = 0.81 - 0.13 = 0.68$$

$$G_{in} - B_{in} = 0.43 - 0.13 = 0.30$$

and $$H_{HSV} = 60° \times \frac{G_{in} - B_{in}}{\mathcal{C}} \bmod 6,$$

so:

$$H_{HSV} = 60° \times \left(\frac{0.30}{0.68} \bmod 6\right) = 26.47°$$

$$S_{HSV} = \frac{0.68}{0.81} = 0.84$$

and $$V_{HSV} = 0.81.$$

This locates the example input color at hue angle $H_{HSV}$=26.47° between Red at 0°/360° and Yellow at 60° with 84% Saturation and a Value of 81% for HSV coordinates: HSV=(26.47°,0.84,0.81).

At S206, the values in the input CMY vector ($C_{in}$, $M_{in}$, $Y_{in}$) in the first device-dependent color space are ranked. In this step, each of minimum, middle (i.e., intermediate), and maximum input values ($Min_{in}$, $Mid_{in}$ and $Max_{in}$) is set to a respective one of $C_{in}$, $M_{in}$ and $Y_{in}$ according to relative value and the mapping is saved. Thus, for the example input, this produces:

$Min_{in}$=$C_{in}$≅0.19,
$Mid_{in}$=$M_{in}$≅0.57, and
$Max_{in}$=$Y_{in}$≅0.87.

At S208, output device-specific reference color values 82 may be provided (see, for example, TABLE 1). Output device reference colors may include at least three gray line colors (W, K and D) representing white, black and the darkest neutral composite within the ink limit. Reference colors typically also include at least six sets of three gamut surface colors ($Z_θ$,$Zk_θ$,$zK_θ$); one set for each of six pure primary and secondary hue angles (C,M Y,R,G,B). From these gamut surface reference colors, corresponding gamut surface colors for all other hue angles θ are computed using interpolation through the hue angle. The vertices of a hue leaf θ in the output color gamut are (W,K,D,$Z_\theta$,$Zk_\theta$,$zK_\theta$).

The CMYK output values corresponding to each ($Z_\theta$,$Zk_\theta$, $zK_\theta$,D) reference point are at device-specific colorant limits. The reference output colors 82 may thus form vertices of a true output color gamut for the device (maximum achievable color gamut given the colorant limits).

Additionally, each reference vertex also includes objective color values, typically predetermined by device color measurement, as well as the device-dependent input color vector corresponding to each reference output vector. Though typically based on color measurements of the raw output device, output color reference values can also be based on proportions from models approximating a generalized gamut shape in perceptual space for the device type or roughly customized based on device characteristics other than precise color measurement including metrics like dot gain or relative density.

At S210, the output corresponding to the input CMY channel having minimum saturation $Min_{in}$ is set to zero, and the middle (i.e., intermediate) valued input channel $Mid_{in}$ is adjusted to maintain the input hue angle, generating ($Min_{out}$=0, $Mid_{out}$, $Max_{out}$=$Max_{in}$), as follows:

$Min_{out}$=0,
$Max_{out}$=$Max_{in}$, and
$Mid_{out}$ is set to a value which preserves the original hue angle θ.

Figure 6:
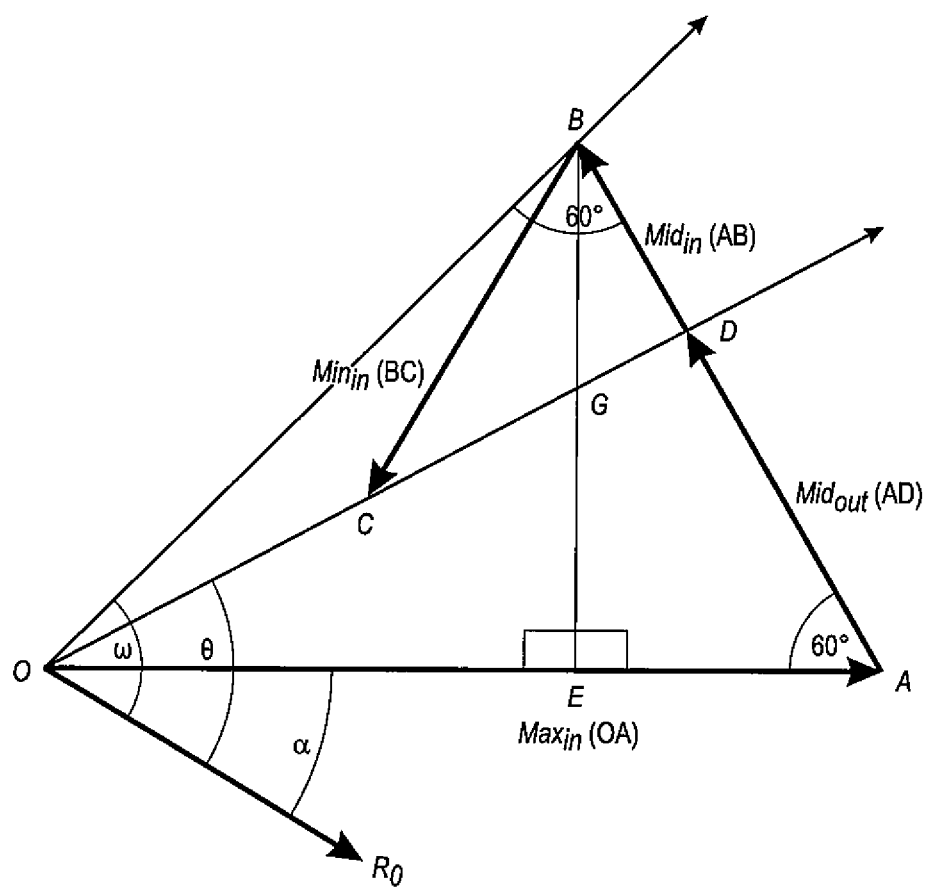
FIG. 6 is a diagram representing C, M, and Y colorants as vectors in the ($H_{HSV}$, $S_{HSV}$) plane.

FIG. 6 shows a diagram representing a procedure for setting $Mid_{out}$ to restore the original hue, after zeroing $Min_{out}$, by adjusting $Mid_{out}$. As discussed above C, M, and Y are ranked and assigned to $Max_{in}$, $Mid_{in}$, and $Min_{in}$, according to relative magnitude so that the diagram and it's mirror image (not depicted) represent all six combinations of C, M and Y corresponding to six 60° partitions of the input ($H_{hsv}$,$S_{hsv}$) plane.

When the vector BC, representing $Min_{in}$ is set to 0, the sum of $Mid_{in}$ and $Max_{in}$ defines an angle ω. To restore the input hue angle θ, vector AB representing $Mid_{in}$ is reduced to vector AD, designated $Mid_{out}$. In the illustrated example, this results in color value C being set to 0 and color value M being adjusted to retain the original hue angle θ.

The diagram depicts a vector sum representing $Max_{in}$, $Mid_{in}$ and $Min_{in}$ corresponding to the C, M and Y inputs as vectors in the ($H_{HSV}$, $S_{HSV}$) plane, where point O represents the gray line with $S_{HSV}$=0, $R_0$ at 0°, hue angle $H_{hsv}$ is denoted by θ, ranked input C, M and Y values are assigned to $Max_{in}$, $Mid_{in}$, and $Min_{in}$. By definition, C, M, and Y hue angles in HSV coordinates are 180°, 300° and 60° (anticlockwise), respectively. Angle α is the angle of the $Max_{in}$ channel, e.g.: if $Max_{in}$ is Y, α=60°, if $Max_{in}$ is M, α=300°, and if $Max_{in}$ is C, α=180°. The vector from point O to point C (OC) represents the input color and θ is the hue angle of the input color relative to red ($R_0$) at hue angle 0 in the ($H_{HSV}$, $S_{HSV}$) plane.

Given the input color in HSV projected to the ($H_{hsv}$, $S_{hsv}$) plane, the magnitude of vector OA, denoted ∥OA∥, is set to $Max_{in}$, ∥AB∥ is set to $Mid_{in}$, and ∥BC∥ to $Min_{in}$, with each of OA, AB and BC at the hue angle of its corresponding C, M or Y component. The vector sum OA+AB+BC=OC has input hue angle θ. When $Min_{in}$ is set to 0, i.e., ∥BC∥ is set to 0, if the magnitude of $Mid_{in}$,∥AB∥, is reduced to ∥AD∥, then the vector sum of just AB and BC remains at input hue angle θ. Thus, $Mid_{out}$=∥AD∥,$Max_{out}$=$Max_{in}$,$Min_{out}$=0.

The length ∥AD∥ can be computed with simple geometry, e.g., as follows:

Let ω be the hue angle for the $Mid_{in}$ colorant, i.e., the angle between $OR_0$ and OB. Let E be a point on OA that defines an angle of 90 degrees between EB and EA. Let G be a point on EB that intersects with OD.
Then:

$$\|EG\| = \left(Max_{in} - \frac{Mid_{in}}{2}\right) * \tan(|\theta - \alpha|)$$

$$\|EB\| = \left(Max_{in} - \frac{Mid_{in}}{2}\right) * \tan(|\omega - \alpha|)$$

$$\|BG\| = \|EB\| - \|EG\|$$

According to the law of sines:

$$\|BD\| = \|BG\| * \frac{\sin(90 - |\theta - \alpha|)}{\sin(60 + |\theta - \alpha|)}$$

$$Mid_{out} = Mid_{in} - \|BD\|$$

In the example case, the intermediate output from this is $Min_{out}$=0, $Max_{out}$≅0.81, and $Mid_{out}$≅0.64, to retain hue angle θ at ~26°. Note that the magnitude increase from OC to OD corresponds to an increase in chroma.

As will be appreciated, there are six possible assignments of non-equal input C, M and Y to $Max_{in}$, $Mid_{in}$ and $Min_{in}$. FIG. 6 represents three of these and the mirror of FIG. 6 represents the other three.

The method above considers how the hue of $Max_{in}$, $Mid_{in}$ and $Min_{in}$ changes with changes to $Min_{in}$ and adjusts $Mid_{out}$ to restore the original hue. Alternatively, $Mid_{out}$ may be computed by other planar geometric or iterative methods. For example, in another embodiment, since after $Min_{out}$ is set to 0, output hue is a function of just $Max_{out}$ and $Mid_{out}$ and all colors of the same hue share the same Mid to Max ratio $$a_\theta = \frac{Mid_{out}}{Max_{out}}.$$

By interpolation along the hue arc from nearest reference Z values, a hue angle specific output color $Z_\theta$ is known for every hue angle with ($z_\theta$,k) output values ($Max_{out_\theta}$,$Mid_{out_\theta}$, 0,0) where values $Max_{out_\theta}$=$Max_{out}$, $Min_{out}$=0 and k=0 are constant. The remaining variable $Mid_{out}$ for $Z_\theta$ in pure subtractive secondary hues Red, Green and Blue is equal to $Max_{out}$ and is equal to 0 in pure Cyan, Magenta, and Yellow primary hues.

Figure 7:
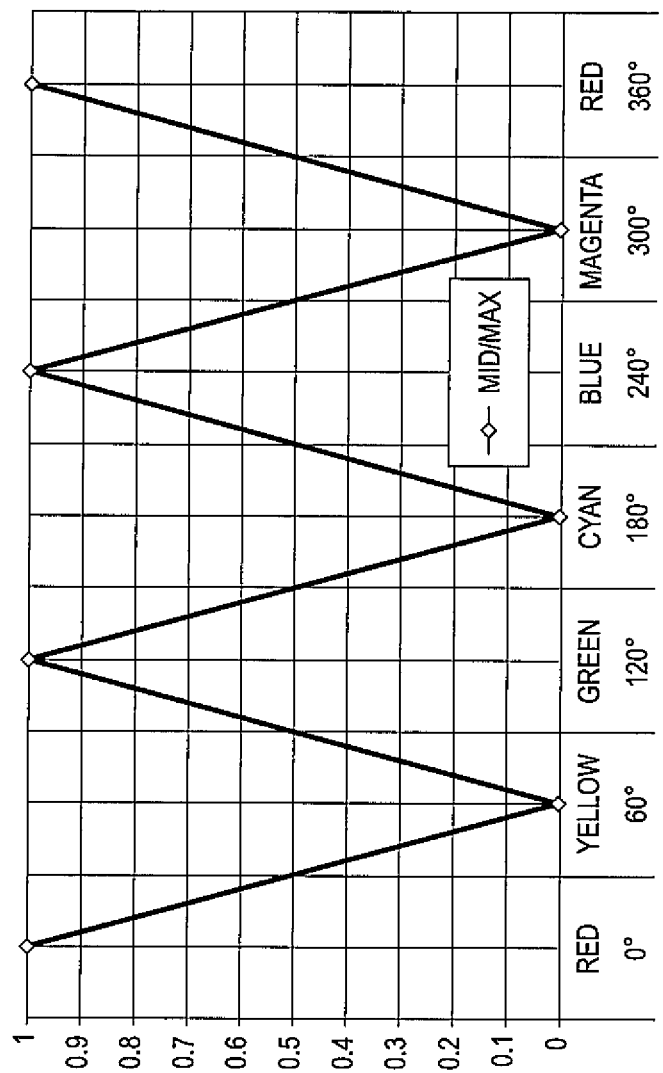
FIG. 7 is a plot of the ratio $$\frac{Mid_{out}}{Max_{out}}$$

For example, FIG. 7 plots the ratio $$\frac{Mid_{out}}{Max_{out}}$$

versus hue angle $H_{HSV}$ in degrees where $Max_{max}$=1.0 at all hue angles. The simple fixed relationship between hue and the ratio of constituent primary colorants in secondary output colors facilitates this second method to maintain input hue angle through the color transformation. FIG. 7 may also be interpreted as the Mid value of $Z_\theta$. FIG. 7 shows values oscillating linearly between 0 at primary and 1 at secondary hue angles. To determine $\alpha_\theta$ ($Mid_{max}$) for any arbitrary hue angle θ, linear scalar interpolation by hue angle from known values at nearest reference angles may be used. Since $Max_{out}=Max_{in}$, the value $Max_{out}$ for the input color is known. Given $\alpha_\theta$ for the input hue, $Mid_{out}$ corresponding to $Max_{in}$ at hue $\theta$ is just $Mid_{out}=Max_{out}\cdot\alpha_\theta$.

At S212, input and output hue-specific reference colors are interpolated from the output device specific reference color data 82 collected for pure primary and secondary hues, such as the example data in TABLE 1, provided at S208. The purpose of step S212 is to assemble input/output hue-specific vertex data necessary to populate a planar hue leaf 80 (FIG. 8) containing the input HSV color 78 and the output color $(C_{int}, M_{int}, Y_{int}, K_{int})$ 70. The reference colors/vertices for a specific hue leaf include three gray-line vertices W, K and D common to all hue angles and three hue angle specific vertex colors $Z_\theta$, $Zk_\theta$, $zK_\theta$ which are computed by interpolation along the hue arc from corresponding nearest pure primary and secondary reference colors such as those in TABLE 1. Together, these six vertices define the shape of hue leaf $\theta$ 80.

At S212, each scalar data channel associated with each of the three hue angle specific vertex colors: $Z_\theta, Zk_\theta, zK_\theta$ is interpolated independently using scalar linear interpolation by hue angle. Interpolation is performed along the 60° hue arc containing the target hue angle $\theta$ between nearest primary and secondary reference colors. For example, assuming an output device with predetermined reference values listed in TABLE 1 and a 274% colorant limit, $Z_\theta$ for $\theta=26°$ ($Z_{26°}$) is interpolated between table values $Z_{0°}$ ($Z_R$ or R) and $Z_{60°}$ ($Z_Y$ or Y), so $Z_{26°}$ expressed in CMYK as colorant percentages, R=(0, 100, 100, 0) and Y=(0, 0, 100, 0), so $Z_{26°}\cong(0, 44.12, 100, 0)$. Hue angle specific reference vertex colors $Zk_\theta$, $zK_\theta$ are similarly interpolated from corresponding predetermined pure primary and secondary color reference values like those listed in TABLE 1. Any additional interior or hue leaf surface vertices that may be added to facilitate alternative embodiments would also be interpolated through the hue arc from nearest reference leaves like this.

The reference colors W, K, and D, each with $S_{HSV}=0$ and $H_{HSV}$ undefined, i.e., independent of $\theta$, are gray-line vertices common to all hue angles $H_{HSV}$. The six predefined and typically premeasured gamut surface and gray-line output device reference colors defining the hue leaf shape may be defined as follows:

W represents no colorant media white, where input (S,V) is (0,1) and $H_{HSV}$ is undefined, i.e., independent of $\theta$. CMYK device output for W is typically: (0, 0, 0, 0).

K (or $K_{max}$) is maximum black, typically 100% K where input $S_{hsv}=0$ and $H_{hsv}$ is undefined, i.e., K is independent of $\theta$. CMYK device output for K is determined by its relative perceptual lightness with respect to W and D. Values of K that are less than K are referred to as k, thus $K=k_{max}$.

D is the empirically determined darkest neutral color and is also independent of $\theta$. HSV for D is defined as (undefined, 0, 0). It typically corresponds to maximum K plus about equal parts C, M and Y, so that C+M+Y+K≤T, where T is the constraint 23 on total colorant coverage. This can vary greatly depending on output device characteristics, T and other device marking constraints. This reference point may also be labeled cmyK indicating that it typically consists of maximum K ($K_{max}$) and fractional C, M and Y. The predetermined constant values of C, M and Y for the darkest neutral color D are denoted $c_g$, $m_g$, and $y_g$ or $Max_g$, $Mid_g$, and $Min_g$. The sum of pre-determined constants $c_g$, $m_g$, $y_g$ and $K_{max}$ (t(D)) is the empirically determined darkest neutral color D within the ink limits for the output device, i.e.: $t(c_g)+t(m_g)+t(y_g)+t(k_{max})\leq T$.

$Z_\theta$ is HSV input color $(\theta,1,1)$: the color with maximum Saturation and Value at hue angle $\theta$. It maps to output color (z,k) defined as $(Max_{out}, Mid_{out}, Min_{out}, k)$ where $Max_{out}$ is at maximum value ($Max_{max}$), typically 100%, $Min_{out}=0$, K=0 and $Mid_{out}$ ranges from 0 to it's maximum value depending on hue angle $\theta$. $Mid_{out}$ is set to achieve the specified $H_{HSV}$ hue (i.e., $\theta$). $Z_\theta$. Thus, also depending on hue angle $\theta$, $Z_\theta$ ranges, in total colorant $t(Z_\theta)$, from 100% (or 1.0) for pure saturated primary colors, where $Mid_{out}=0$, to 200% (or 2.0) for saturated secondary colors where $Mid_{out}=Mid_{max}$. All $Z_\theta$ values for hue angles between primary and secondary (reference) hues are interpolated from $Z_\theta$ of the nearest corresponding reference colors. Hue is determined by the ratio $Mid_{out}$ to $Max_{out}$, this ratio is a constant for all colors of the same hue where $K\leq K_{max}$ (all colors in a hue leaf with $K<K_{max}$) so most colors in the hue leaf share the same $Mid_{out}$ to $Max_{out}$ ratio.

With the color vector specific ordering determined at S210 an intermediate or output color (z,k) defined in this embodiment as $(Max_{out}, Mid_{out}, Min_{out}, k)$ may be expressed equivalently as (C, M, Y, K).

The device dependent input color expressed as CMY may range from 0 to 300%. Four colorant (typically CMYK) output may be addressable up to colorant requests of 400% but must be limited to total colorant T for the output request to be honored. All input space colors are mapped to output colors with colorant totals less than or equal to output limit T.

Since all reference colors map to output colors with total colorant less than or equal to output limit T, output device color exceeding colorant limit T are not mapped from input color space and so do not appear in input hue leaf diagrams plotted in (S,V). These output device addressable but unmapped regions of unusable output device color space are identified as 84 in FIGS. 13 and 15. FIGS. 13 and 15 depict hue leaf diagrams plotted in printer independent objective CIELAB color in (L*,b*) and (L*,C*) planes.

$ZK_\theta$ is included herein to describe the use of $Zk_\theta$ and $zK_\theta$ to map out over colorant limit colors. $ZK_\theta$ is the unrestricted composite of the most saturated color in hue leaf $\theta$: $Z_\theta$, and maximum black. This is the output color consisting of maximum colorant mixture $Z_\theta$, ranging from 100 to 200%, plus maximum black: K, which is typically 100% so, depending on hue and maximum per-channel colorant, $ZK_\theta$ ranges from 200% to 300%. Since the colorant limit T is typically much less than 300%, output colors $ZK_\theta$ can exceed the limit T at many hue angles, especially near secondary hues. To exclude colors beyond the colorant limits and map as much output gamut as possible, two additional output gamut surface colors can be used as hue leaf vertices in place of $ZK_\theta$. These are composite colors $Zk_\theta$ and $zK_\theta$. In the exemplary method, the value $ZK_\theta$ is not used. In hues where $ZK_\theta$ would be in gamut, as represented in FIG. 9 and the left side of FIG. 13 representing a yellow (primary color) hue leaf, it is equal to $Zk_\theta$ and $zK_\theta$ resulting in a zero area $R_2$ interpolation region.

Gamut surface color $zK_\theta$ at hue angle $\theta$ maps input HSV vector $(\theta,1,1)_{HSV}$ to CMYK output maximum K plus as much colorant mixture $Z_\theta$ as possible, up to $Z_\theta$, without exceeding T i.e.: $t(zK_\theta)\leq T$.

Gamut surface color $Zk_\theta$ at hue angle $\theta$ maps to CMYK output colorant mixture $Z_\theta$ plus as much K as possible, up to $K_{max}$, without exceeding T, i.e., $(Zk_\theta)\leq T$. The input HSV assigned to $Zk_\theta$ is $$\left(\theta, 1, \frac{d(Zk_\theta, zK_\theta)}{d(Z_\theta, zK_\theta)}\right)_{HSV},$$

where $d(Z_\theta, zK_\theta)$ is a perceptual color difference between $Z_\theta$ and $zK_\theta$ such as $\Delta E(Z_\theta, zK_\theta)$ so that $V_{HSV}$ is positioned between $Z_\theta$ with $V_{HSV}=1$ and $zK_\theta$ with $V_{HSV}=0$ approximating it's relative perceptual position on the gamut surface in hue leaf $\theta$.

In hues near primary colors C, M and Y where colorant Mid is small, and T>200%, $t(ZK_\theta) \leq T$, $ZK_\theta$ is within the output gamut. In this case, $zK_\theta = Zk_\theta = ZK_\theta$ so interpolation region $R_2$ has no area. This can be seen in FIG. 9 and the left half of FIG. 13, representing output primary color yellow.

The input coordinates of gamut surface colors $zK_\theta$ are $(\theta,1,1)_{HSV}$ and, assuming $d(Z_\theta, zK_\theta) > 0$, input coordinates of gamut surface colors $Zk_\theta$ are $$\left(\theta, 1, \frac{d(Zk_\theta, zK_\theta)}{d(Z_\theta, zK_\theta)}\right)_{HSV},$$

as listed in TABLE 1 and depicted in FIG. 8. In other embodiments, other input color coordinates for these output colors creating slightly different results are also possible and may better represent the color behavior of a particular output device, depending on output device characteristics.

FIG. 8 represents the input hue leaf at hue angle $\theta$ on the $(S_{HSV}, V_{HSV})$ plane in cylindrical HSV space and it's mapping to a subset of the projections from CMYK output space depicted in FIG. 1 and FIG. 2 for S104. Each $(S_{HSV}, V_{HSV})$ input coordinate maps to a four dimensional output coordinate representing CMYK output color denoted (z,k) consisting of a three dimensional vector $z=(Max_{out}, Mid_{out}, Min_{out})$ and scalar k. Vector (z,k), with ranking determined at S206, is equivalent to a (c,m,y,k) output vector at output device-dependent hue angle $\theta$. The output hue leaf is the area bounded by the six vertex colors $Z_\theta$, $Zk_\theta$ and $zK_\theta$ on the gamut surface at angle $\theta$ and the neutral reference colors: W, K and D on the gray-line. Gray-line colors are common to all hues.

Only the input color vector determines the output hue angle (i.e., the device-dependent output hue angle is always equal to the device-dependent input hue angle). The leaf shapes in device-independent perceptual color space, approximated in FIG. 13 and FIG. 15 for Yellow and Blue hue leaves, represent slices of the output device gamut, depicted as the wire frame in FIG. 14 and FIG. 17, and are determined from relative perceptual space coordinates measured on the raw output device and which are referred to herein as reference colors 82.

The output device reference colors 82, discussed above and listed in Table 1, are typically output device colors measured at output primary and secondary hue angles. In the embodiment described, output device reference colors not on the gray line are on the gamut surface. These are interpolated through hue angle to determine corresponding hue angle specific vertex values used in each hue leaf.

The hue leaf 80 may subsequently be partitioned into regions to facilitate interpolation. The selective black replacement component 68 includes instructions for performing partitioning of the hue leaf. In one embodiment, the interpolation regions are triangular. While partitioning generally produces two or more regions of non-zero size, such as at least three regions, in some cases, partitioning may result in only one region of non-zero size. As one example, three interpolation regions $R_1$, $R_2$, and $R_3$ are generated. As another example, in FIG. 15, interpolation region $R_2$ may have a zero area and thus not be shown on the hue leaf. $R_1$ is a quadrilateral area defined by vertices W, $Z_\theta$, $Zk_\theta$, and K. $R_2$ is a triangular area defined by vertices $Zk_\theta$, $zK_\theta$ and K. $R_3$ is a second triangular area defined by vertices $zK_\theta$, D, and K. There are many ways to partition hue leaves into regions and interpolate coordinates values within these regions. The method used should reduce to linear interpolation between nearest reference vertices on hue leaf edges and provide at least piecewise continuity over boundaries between interpolation regions. This ensures that if reference colors are set correctly, edges interpolated between hue leaf vertices will maximize gamut volume without exceeding colorant limit(s) T and that the resulting color gamut will be at least minimally smooth everywhere.

Barycentric interpolation is a triangular interpolation method meeting these requirements. It may be used to interpolate triangular regions $R_2$ and $R_3$. Quadrilateral region $R_1$ may be interpolated using quadrilateral interpolation or may be split into two triangular sub-regions and each may be interpolated with barycentric interpolation. For example $R_1$ may be split into two triangular interpolation regions, either as sub-regions $R_1a$ and $R_1b$ defined as triangles $W,K,Z_\theta$ and $K,Zk_\theta,Z_\theta$ respectively or as $R_1a'$ and $R_1b'$ defined as triangles $W,K,Zk_\theta$ and $W,Zk_\theta,Z_\theta$ respectively. Alternatively, region $R_1$ could be partitioned into four or more triangular sub-regions. One or more additional reference vertex might be added to the hue leaf to facilitate this.

Additional reference vertices not used in the embodiment described may be added within the hue leaf to create additional interpolation regions or to represent non-linearity in output device color better. However, if additional reference vertices are used they should be added to corresponding positions in all reference hues. Ideally, as measured in perceptual output device space, they should also be as close to equidistant from nearest neighboring reference points in the hue leaf as possible.

In the exemplary embodiment, triangular barycentric interpolation is used in regions $R_2$ and $R_3$ as well as in the two triangular sub-regions created by splitting of $R_1$ into sub-regions $R_1a$ and $R_1b$, as described in detail below. For most purposes, this provides good results even though it is only piecewise continuous (differentiability class $C^0$) between four triangular interpolation regions. Black generation with limited piecewise continuity between interpolation regions is acceptable because results are typically only used to populate a relatively low-resolution look-up table including most if not all reference vertices. However, a more demanding application may require a smoother result. This is achievable using, for example, any one of several forms of barycentric interpolation generalized to interpolate polygons with more than three sides.

If necessary, smoothness can be improved, at the cost of some interpolation control, if triangular interpolation regions are merged into fewer polygons and replaced by one or more polygonal interpolations. Several generalized barycentric interpolation schemes can provide this. Generalized barycentric methods may, for example, be used to interpolate not only quadrilateral region $R_1$ without subdivision but may interpolate polygons consisting of, for example, $R_1$ plus $R_2$ as a pentagonal and triangular region $R_3$, $R_2$ plus $R_3$ as two quadrilaterals or $R_1$ plus $R_2$ plus $R_3$ as a single irregular hexagon. With all hue leaf regions combined into a single hexagonal interpolation per hue leaf, the resulting gamut is smooth (differentiability class $C^\infty$). Since this eliminates some or all boundaries between interpolation regions generalized barycentric interpolation methods can increase interpolation smoothness over the hue leaf while still simplifying to linear interpolation between nearest vertex colors along hue leaf edges as required to ensure that the mapping fills available gamut volume without exceeding colorant limits T. If the output gamut to be mapped is known to be convex, then additional interpolation alternatives are available. Whatever interpolation method(s) are used the same methods should be used for corresponding interpolation regions at all hue angles. This limits the risk of introducing hue-to-hue discontinuities in the result.

The hue leaf in FIG. 15 maps to an output hue leaf that does not exceed total colorant limits so region $R_2$ has zero area. This is the case for primary output colorants C, M or Y and near primary output hues where total colorant used by shades with K are typically less than colorant limit T and much less than 300%.

Four-channel color 70, $C_{int}, M_{int}, Y_{int}, K_{int}$ is output at S218 corresponding to vector $(z_\theta, k)$ for color P labeled 78 in FIG. 8 interpolated from some or all hue leaf reference points $\{W, K, D, Z_\theta, Zk_\theta, zK_\theta\}$ in (S,V) on hue leaf $\theta$ as described above. The vector $z=(Max_{out}, Mid_{out}, Min_{out})$ consists of $C_{int}, M_{int}, Y_{int}$ output channel values ordered according to relative magnitude determined at S206 as $Max_{out}$, $Mid_{out}$ and $Min_{out}$. The scalar k or $k_{int}$ is the black channel value created by the black generation process. Components $Max_{out}, Mid_{out}$ and $Min_{out}$ of vector z are mapped back to their original $C_{in}, M_{in}, Y_{in}$ order designation when conversion is complete and before processing the next input color. Scalar value k is the black channel value for the 4-channel output color $C_{int}, M_{int}, Y_{int}, K_{int}$.

At $Z_\theta$, input Saturation ($S_{HSV}$) and Value ($V_{SV}$) are 1.0 and the output color channel corresponding to $Max_{out}$ is at its maximum value, typically 1.0, $Min_{out}$ is 0, k is 0 and $Mid_{out}$ ranges from 0 to its maximum value, also typically 1.0, depending on hue angle.

By way of example, TABLE 1 shows predetermined output device color reference points 82. This example assumes a 274% colorant limit T and a darkest neutral output color D using 100% Black, 58% Cyan, 58% Magenta and 58% Yellow for a colorant total of 274%. Lower case letters in output color names indicate color channels with fractional output values less than the channel maximum (typically 100%). In the illustrated example, output color bK is a composite of blue (Cyan plus Magenta) and black consisting of 100% Black, 87% Cyan and 87% Magenta for a total of 274% colorant. Output color Bk is a composite of blue (Cyan and Magenta) and black consisting of 100% Cyan, 100% Magenta and 74% Black, for a total of 274% colorant.

Included for each output reference vertex are corresponding CMYK output device coordinates with each of C, M, Y and K as fractional coverage from 0 to 100%. Relative colorimetric differences are pre-measured or otherwise pre-determined for each reference color. In this example these perceptual color coordinates are used to determine input HSV Value ($V_{HSV}$) components for references colors K (Maximum Black) and reference composite gamut surface colors gK, rK and bK. These three output gamut surface composite reference colors are composed of as much secondary red, green or blue as possible shaded with 100% K within total colorant limits. They are generally identified as zK in FIG. 8. These reference values are darkly shaded in TABLE 1. Input HSV Value ($V_{HSV}$) for shaded primary output colors cK, mK and yK are not determined this way because in the example presented in Table 1, all colors at these hue angles are within the colorant limit). The table also includes values for total output ink and the input HSV coordinates not derived from colorimetric data.

TABLE 1

Example output device specific color reference points

| H (°) | S | V | Output Color Name | C (%) | M (%) | Y (%) | K (%) | Total ink (%) |
|---|---|---|---|---|---|---|---|---|
| all | 0 | 1 | W | 0 | 0 | 0 | 0 | 0 |
| all | 0 | $V_K$ | K | 0 | 0 | 0 | 100 | 100 |
| all | 0 | 0 | D | $\frac{(T-100)}{3}=58$ | $\frac{(T-100)}{3}=58$ | $\frac{(T-100)}{3}=58$ | 100 | 274 |
| 0 | 1 | 1 | R ($Z_{0°}$) | 0 | 100 | 100 | 0 | 200 |
| 0 | 1 | 0 | Rk ($Zk_{0°}$) | 0 | 100 | 100 | T − 200 = 74 | 274 |
| 0 | 1 | $V_{rK}$ | rK ($zK_{0°}$) | 0 | $\frac{(T-100)}{2}=87$ | $\frac{(T-100)}{2}=87$ | 100 | 274 |
| 60 | 1 | 1 | Y ($Z_{60°}$) | 0 | 0 | 100 | 0 | 100 |
| 60 | 1 | 0 | YK ($ZK_{60°}$) | 0 | 0 | 100 | 100 | 200 |
| 120 | 1 | 1 | G ($Z_{120°}$) | 100 | 0 | 100 | 0 | 200 |
| 120 | 1 | 0 | Gk ($Zk_{120°}$) | 100 | 0 | 100 | T − 200 = 74 | 274 |
| 120 | 1 | $V_{gK}$ | gK ($zK_{120°}$) | $\frac{(T-100)}{2}=87$ | 0 | $\frac{(T-100)}{2}=87$ | 100 | 274 |
| 180 | 1 | 1 | C ($Z_{180°}$) | 0 | 0 | 100 | 0 | 100 |
| 180 | 1 | 0 | CK ($ZK_{180°}$) | 0 | 0 | 100 | 100 | 200 |
| 240 | 1 | 1 | B ($Z_{240°}$) | 100 | 100 | 0 | 0 | 200 |
| 240 | 1 | 0 | Bk ($Zk_{240°}$) | 100 | 100 | 0 | T − 200 = 74 | 274 |
| 240 | 1 | $V_{bK}$ | bK ($zK_{240°}$) | $\frac{(T-100)}{2}=87$ | $\frac{(T-100)}{2}=87$ | 0 | 100 | 274 |

TABLE 1-continued

Example output device specific color reference points

| H (°) | S | V | Output Color Name | C (%) | M (%) | Y (%) | K (%) | Total ink (%) |
|---|---|---|---|---|---|---|---|---|
| 300 | 1 | 1 | M ($Z_{300°}$) | 0 | 0 | 100 | 0 | 100 |
| 300 | 1 | 0 | MK ($ZK_{300°}$) | 0 | 0 | 100 | 100 | 200 |

TABLE 1 lists 18 vertices, one per row, referred to as "reference colors" or "output device reference colors" herein. Each vertex comprises input (HSV) and corresponding intermediate output (CMYK) vectors defining six primary and secondary hue leaves. Corresponding values for all other hue angles are computed from these values using interpolation between hues.

Colorimetric measurements are used in this example to determine the four $V_{HSV}$ values: $V_K$, $V_{rK}$, $V_{gK}$, $V_{bK}$ using relative perceptual color differences from neighboring reference colors of the same HSV Hue and Saturation with Values V=0 and V=1. For example, $V_K$ may be determined from $\Delta E(K,D)$: the perceptual difference between K (maximum black colorant only) and D (the darkest neutral composite gray) divided by $\Delta E(W,D)$: the perceptual difference between W (white or no colorant) and D:

$$V_K = \begin{cases} 0, & \Delta E(W, D) \leq 0 \\ \frac{\Delta E(K, D)}{\Delta E(W, D)}, & \Delta E(W, D) > 0 \end{cases}$$

Likewise, $V_{rK}, V_{gK}, V_{bK}$ may be determined with:

$$V_{rK} = \begin{cases} 0, & \Delta E(R_\theta, rK_\theta) \leq 0 \\ \frac{\Delta E(Rk_\theta, rK_\theta)}{\Delta E(R_\theta, rK_\theta)}, & \Delta E(R_\theta, rK_\theta) > 0 \end{cases}$$

$$V_{gK} = \begin{cases} 0, & \Delta E(G_\theta, gK_\theta) \leq 0 \\ \frac{\Delta E(Gk_\theta, gK_\theta)}{\Delta E(R_\theta, gK_\theta)}, & \Delta E(G_\theta, gK_\theta) > 0 \end{cases}$$

$$V_{bK} = \begin{cases} 0, & \Delta E(B_\theta, bK_\theta) \leq 0 \\ \frac{\Delta E(Bk_\theta, bK_\theta)}{\Delta E(B_\theta, bK_\theta)}, & \Delta E(B_\theta, bK_\theta) > 0 \end{cases}$$

or generalized for all hue angles θ with Z and z and color difference formula d( ):

$$V_{zK} = \begin{cases} 0, & d(Z_\theta, zK_\theta) \leq 0 \\ \frac{d(Zk_\theta, zK_\theta)}{d(Z_\theta, zK_\theta)}, & d(Z_\theta, zK_\theta) > 0 \end{cases}$$

Additional reference values 82 may be added for other embodiments. For example, in addition to values at primary and secondary output colorant hue leaf edges, alternative embodiments may include colors within the hue leaf and may add reference leaves at additional hue angles. Also, if a cylindrical device-dependent input color space different than the exemplary HSV space is used or an output device with characteristics or color topology significantly different than the four-color output device described for the exemplary embodiment, changing the input space topology, different gamut surface vertices and formula to match are likely required.

At S214, and with reference also to FIG. 8, a hue leaf 80 containing the input color 78 is constructed relating device dependent input to intermediate output color. The shape (two-dimensional) of the hue leaf may be based on output device colorant topology, output colorant limits and relative perceptual color from measurements of output device color.

The hue leaf is the surface through the gray-line at hue angle θ passes through cuboid 2, 4 or 6 and cuboid 8 in FIGS. 1 and 2 that together comprise the maximum gamut volume for the output device ( ) bound the hue leaf. The leaf is generated for the input hue angle θ, from the input color expressed in the second cylindrical device-dependent color space (e.g., HSV) and colorant limit(s) 43 (specifically, T) for the print engine, and relevant predetermined (predefined or computed) output device reference color values 82 (e.g., W, K, D, $Z_\theta$, $Zk_\theta$, and $zK_\theta$). The hue leaf thus describes a slice of an output color gamut that satisfies the colorant limit(s) T for the output device.

Hue leaf 80 is the surface at hue angle θ bounded by output colorant mixtures W, K, D, $Z_\theta$, $Zk_\theta$, and $zK_\theta$. The hue leaf 80 may be partitioned into one or more interpolation regions. For hue angles where $ZK_\theta$ is within colorant limits $ZK_\theta = Zk_\theta = zK_\theta$ the hue leaf may be partitioned into two regions, $R_1$ and $R_3$ corresponding to the boundary between the two intersected 3D projections of the CMYK output volume depicted in FIG. 1 and FIG. 2 at hue angle θ. All of the vertices: W, K, D, $Z_\theta$, $Zk_\theta$, and $zK_\theta$ defining the polygon representing the hue leaf are within the output colorant limit so no color inside the leaf will exceed the colorant limit.

$ZK_\theta$ exceeds the output colorant limit $Zk_\theta$ and $zK_\theta$ are not equal and region $R_1$ is further divided into regions $R_1$ and $R_2$ to eliminate the non-compliant (out of gamut) area bounded by D, $Zk_\theta$ and $zK_\theta$. Non-conditionally, hue leaf 80 is the 2D surface bounded by output colors W, K, D, $Z_\theta$, $Zk_\theta$, and $zK_\theta$ consisting of regions $R_1$ $R_2$ and $R_3$. At hue angles where ZK is within colorant limits the area of region $R_2$ is zero.

Region $R_1$ is bounded by four reference colors: W,$Z_\theta$,$Zk_\theta$, and K. $R_2$ is bounded by reference colors: K,$Zk_\theta$, and $zK_\theta$. $R_3$ is bounded by three reference colors K,$zK_\theta$, and D. Within hue leaf regions $R_1$ and $R_2$, the ratio $$\frac{Mid_{out}}{Max_{out}}$$

is constant for all colors and $Min_{int}=0$. Output K values in regions $R_1$ and $R_2$ range from 0 to K (K is typically 100% or 1.0). All K values in region $R_3$ are equal to K. At hue angles θ where $t(Z_\theta)+K \leq T$, region $R_2$ has no area.

In addition to defining regions $R_1$, $R_2$, and $R_3$, the quadrilateral region $R_1$ (W, $Z_\theta$, $Zk_\theta$, K) may itself be subdivided, for example, into two triangles: $R_1a$ and $R_1b$, to facilitate triangular barycentric interpolation. Barycentric coordinates may be used both to find the hue leaf partition containing input color 78 and to interpolate from input coordinates (S,V) to the output device color vector ($z_\theta$, k). How the quadrilateral region is split determines the shape of the triangles produced, which can alter interpolation results. If split from W to $Zk_\theta$ triangular regions: {(W,K,$Zk_\theta$), (W,$Zk_\theta$,$Z_\theta$)} are created. If split from $Z_\theta$ to K, the triangular interpolation regions: {(W,K,$Z_\theta$), (W,K,$Z_\theta$)} are created. Which of these is best depends upon output device specific considerations such as hue leaf shape; either option might have a slight advantage over the other. To avoid possible additional artifacts, the same subdivision should be used for all hue angles.

At S216, and with continued reference to FIG. 8, the interpolation region in hue leaf θ containing the input vector 78 is found. With the hue leaf partitioned into triangular regions, the region containing input vector 78 ($p=(s_p,v_p)$ at hue angle θ, where $s_p$ and $v_p$ are values of S and V, respectively) is conveniently found using barycentric coordinates. Point p at barycentric coordinates ($\lambda_1,\lambda_2,\lambda_3$) computed with respect to a given triangular region R is within R only if all three coordinates ($\lambda_1,\lambda_2,\lambda_3$) are greater than or equal to 0 and less than or equal to 1, i.e.: $0 \leq \lambda_i \leq 1 \forall$ in 1,2,3.

Assuming a triangular region R with vertices $r_1,r_2,r_3$ on counter-clockwise order where $r_i=(s_i,v_i)$, the barycentric coordinates (S,V) for input color $p=(s_p,v_p)$ at hue angle θ with respect to R can be computed using:

$$\det(R) = (s_2 - s_1)\cdot(v_3 - v_1) - (s_3 - s_1)\cdot(v_2 - v_1)$$

$$\lambda_1 = \frac{((s_2 - s_p)\cdot(v_3 - v_p) - (s_3 - s_p)\cdot(v_2 - v_p))}{\det(R)}$$

$$\lambda_2 = \frac{((s_3 - s_p)\cdot(v_1 - v_p) - (s_1 - s_p)\cdot(v_3 - v_p))}{\det(R)}$$

$$\lambda_3 = \frac{((s_1 - s_p)\cdot(v_2 - v_p) - (s_2 - s_p)\cdot(v_1 - v_p))}{\det(R)}$$

The three numbers ($\lambda_1,\lambda_2,\lambda_3$) are the barycentric coordinates of color $p=(s_p,v_p)$ in triangle R with vertices {$r_1,r_2,r_3$}={$(s_1,v_1),(s_2,v_2),(s_3,v_3)$}.

To find the region containing p, for each triangular region $R_1a$, $R_1b$, $R_2$ and $R_3$ of hue leaf θ, the barycentric coordinates for color p with respect to the region are computed and evaluated. If none of the coordinates ($\lambda_1,\lambda_2,\lambda_3$) is less than zero or greater than one, color p must be inside the corresponding region and the search is complete, otherwise the search continues with the next unevaluated region until a region containing the input color 78 is found. Since all input colors in the $(S,V)_\theta$ hue leaf are contained within one or more of the triangular regions partitioning hue leaf θ, the input color will be found.

At S218, with continued reference to FIG. 8, after locating the region containing input vector 78, i.e.: $p=(s_p,v_p)$ at hue angle θ, the barycentric coordinates for p: ($\lambda_1,\lambda_2,\lambda_3$), are used again as weights to interpolate the output color vector ($z_\theta$, k) at p from output values $f(r_1),f(r_2),f(r_3)$ at region vertices $r_1,r_2$ and $r_3$, e.g., using the formula:

$$(z_\theta,k)=f(p)\approx\lambda_1 \cdot f(r_1)+\lambda_2 \cdot f(r_2)+\lambda_3 \cdot f(r_3)$$

where ≈ means approximately equal to, or equal to.

For example, assuming p were to be found in triangular partition $R_1b$ (defined by splitting $R_1$ through K and $Z_\theta$ along the dashed line in FIG. 8), the intermediate color vector ($z_\theta$, k)=f(p) may be determined as follows:

From FIG. 8, vertices defining region $R_1b$ in counter-clockwise (anti-clockwise) order starting with $Z_\theta$ at $r_1$ are:

$$f(r_1)=Z_\theta, f(r_2)=K, f(r_3)=Zk_\theta$$

and also with reference to FIG. 8, output values for these vertices equal:

$$Z_\theta=(Max_{max}, a_\theta \cdot Max_{max}, 0, 0),$$

$$K=(0,0,0,k_{max}),$$

$$Zk_\theta=(Max_{max}, a_\theta \cdot Max_{max}, 0, \min(T-(Max_{max}+a_\theta \cdot Max_{max}), k_{max})).$$

so that output vector f(p) i.e.: ($Max_p, Mid_p, Min_p, k_p$) is $$Max_p=\lambda_1 \cdot Max_{max}+\lambda_2 \cdot 0+\lambda_3 \cdot Max_{max}$$

$$Mid_p=\lambda_1 \cdot a_\theta \cdot Max_{max}+\lambda_2 \cdot 0+\lambda_3 \cdot a_\theta \cdot Max_{max}$$

$$Min_p=\lambda_1 \cdot 0+\lambda_2 \cdot 0+\lambda_3 \cdot 0$$

$$k_p=\lambda_1 \cdot 0+\lambda_2 \cdot k_{max}+\lambda_3 \cdot \min(T-(Max_{max}+a_\theta \cdot Max_{max}), k_{max})$$

and after removing zero terms, f(p) i.e.: ($Max_p, Mid_p, Min_p, k_p$) is:

$$Max_p=\lambda_1 \cdot Max_{max}+\lambda_3 \cdot Max_{max}$$

$$Mid_p=\lambda_1 \cdot a_\theta \cdot Max_{max}+\lambda_3 \cdot a_\theta \cdot Max_{max}$$

$$Min_p=0$$

$$k_p=\lambda_2 \cdot k_{max}+\lambda_3 \cdot \min(T-(Max_{max}+a_\theta \cdot Max_{max}), k_{max})$$

Since the output device reference colors 82 are all within colorant limits, and $\lambda_1+\lambda_2+\lambda_3=1$, output colors interpolated from them in the output device-dependent color space are also within colorant limits.

In FIG. 13, regions outside output colorant limits 84 are shown as out of gamut colors. This is a simplified approximation to illustrate perceptual scale. In CIELAB the blue hue angle does not match blue in HSV and does not share the same plane as yellow. Also, in perceptual (device-independent) vertex colors within a hue leaf are not co-planar and gamut boundaries are not on lines and planes between vertices, so this depiction is only approximate. In addition to the six reference point derived color vertices, the diagram includes, BK using 300% colorant and CMYK using 400% colorant, both beyond typical colorant limits. CMYK and BK are included to bound three additional regions outside output device colorant limits, two in the Blue hue leaf and one in the Yellow leaf. These regions marked as out of gamut are not mapped from input coordinates and are therefore not used in color transforms.

At S220, the ranked output vector $z_\theta$=($Max_{out}, Mid_{out}, Min_{out}$) is re-ordered according to the rank mapping saved in S206 to produce:

$$CMY_{int}=(C_{int}, M_{int}, Y_{int}).$$

Concatenating this result with $k_{int}$ from S218 yields the first stage output of S104:

$$CMYK_{int}=(C_{int}, M_{int}, Y_{int}, K_{int}).$$

For example, if output at p is ($Max_p, Mid_p, Min_p, k_p$) where:

$$Max_p=\lambda_1 \cdot Max_{max}+\lambda_3 \cdot Max_{max}$$

$$Mid_p=\lambda_1 \cdot a_\theta \cdot Max_{max}+\lambda_3 \cdot a_\theta \cdot Max_{max}$$

$$Min_p=0$$

$$k_p=\lambda_2 \cdot k_{max}+\lambda_3 \cdot \min(T-(Max_{max}+a_\theta \cdot Max_{max}), k_{max})$$

and the rank mapping for this color from S206 is:
  Maximum↔Yellow
  Middle↔Magenta
  Minimum↔Cyan
then intermediate $CMYK_{int}=(C_{int},M_{int},Y_{int},K_{int})$ is:

$$C_{int}=Min_p=0$$

$$M_{int}=Mid_p=\lambda_1 \cdot a_\theta \cdot Max_{max}+\lambda_3 \cdot a_\theta \cdot Max_{max}$$

$$Y_{int}=Max_p=\lambda_1 \cdot Max_{max}+\lambda_3 \cdot Max_{max}$$

$$K_{int}=\lambda_2 \cdot k_{max}+\lambda_3 \cdot \min(T-(Max_{max}+a_\theta \cdot Max_{max}),k_{max})$$

As an example, FIG. 13 illustrates a slice through the color gamut of a specific printer including Yellow and Blue hue leaves with perceptually uniform vertices in L*a*b* projected to the a*=0 plane providing a perspective similar to the gamut surface image of FIG. 14. In this diagram, an output device colorant limit of 274% is assumed. The Yellow and Blue hue leaves are partitioned into interpolation regions. The Blue leaf (on the right) maps to an output hue leaf that exceeds total colorant limit in some areas producing a region R2 with non-zero area. This is typical for Red, Green, Blue and surrounding nearby secondary hues where shades with K can reach 300%.

The dashed outline represents the former hue leaf size and shape before the implementation of S104. The outer bound (connecting Y,W,B,Bk,bK,D,YK=Yk=yK) approximates the hue leaf with the present method. Data are depicted in their approximate relative positions in perceptual CIELAB space assuming illuminant D65. In perceptually uniform space, straight lines and shading between measured reference points only approximate perceptual gamut surface and region boundaries. Interpolation regions within each hue leaf, defined by bounding measured reference points include $R_1{}^y$ and $R_3{}^y$ for the Yellow leaf on the left and $R_1{}^B$, $R_2{}^B$ and $R_3{}^B$ for the blue leaf on the right. In addition, output regions and reference points beyond the colorant limit are shaded (see key). This diagram is included for comparison to corresponding topologically similar non-colorimetric hue leaf diagrams such as FIG. 9 corresponding to the Yellow leaf and FIG. 8 corresponding to the Blue leaf.

In a controlled comparison to an existing high-performing black generation method in one printer, the output color gamut was increased by more than 9% CIELAB volume. In tests on another printer, the method stabilized excessive color variability in and around the gray-line, maximized color gamut volume and reduced toner use compared to the existing method.

FIG. 14 illustrates the color gamut surfaces for the example printer, plotted as an orthographic projection in L*a*b* space from approximately the same perspective as the slice represented in FIG. 13. Out-of-gamut colors (shown in FIG. 13), are not represented. The gamut volume from a conventional algorithm is represented by the solid surface. The wire frame surface depicts the gamut produced by the current method.

Assuming an ink-limit greater than 200%, all shaded primary colors including YK, CK and MK are within the output colorant limit. Since YK is within limit, Yk, yK and YK are all equal and interpolation region $R_2{}^r$ is not used (i.e., has zero area). However, shades with R, G and B: BK (CMK), GK (CYK) and RK (MYK) use 300% colorant and so exceed colorant maximum. In this case Bk is not equal to bK and interpolation region $R_2$b (the triangle (K,Bk,bK) has non-zero area. In this figure, unusable regions of color requiring more colorant than the limit include: the triangles (YK,D,CMYK) and (K,Bk,bK) and the quadrilateral area (D,bK,BK,CMYK). These discarded (unmapped) regions are shaded as "out of gamut colors (outside hue leaf)". Also, it may be noted that in the blue hue leaf, color must lighten as it traverses the dark blue gamut surface from bK to D in interpolation region $R_3$b.

FIGS. 15 and 16 show hue leaf diagrams representing a blue hue leaf visualized in output and input space. FIG. 15 represents the six pre-measured ink mixtures used to define the blue output hue leaf in their approximate relative position in CIELAB D65 device-independent (perceptual) color space like the Blue leaf in FIG. 13. FIG. 15 is a simplified approximation to illustrate perceptual scale. In CIELAB, the blue hue angle does not match blue in HSV. Thus, points within a hue leaf are not co-planar and gamut boundaries are not on lines and planes between vertices. Segments between vertices are for visualization only, they are in perceptual space and do not trace to the gamut boundary. In addition to the six reference point derived colors, the diagram includes BK*, using 300% colorant, and CMYK* using 400% colorant. Both these color mixtures are beyond the typical colorant limits. In FIG. 15, therefore, the area defined by a triangle (BK*,bK,Bk) is outside the colorant limits, as is the area defined by a quadrilateral (BK*,CMYK*,D,bK). These two regions are not mapped to input coordinates and are therefore not used.

FIG. 16 illustrates the in-gamut output colors from FIG. 15, in their corresponding positions in HSV input space with K,Bk and bK positioned in the $V_{HSV}$ axis according to relative perceptual distances according to the formula in FIG. 8.

FIG. 17 is an orthographic projection of output gamut volumes viewed from +b*, for the example printer. Like FIG. 14, this is the raw CMYK output from RGB input samples transformed through two different black generation methods. The solid volume corresponds to a prior method. The wire-frame represents the output gamut volume produced by the present method. Note the increased gamut volume in low L* colors. An increased CIELAB color gamut volume of 9% over the prior method was observed. FIG. 17 represents the same output points as FIG. 16, plotted on an input hue leaf in HSV (device-dependent) color space with K,Bk and bK positioned to preserve output device-dependent relative perceptual distance from D. Here B is a specific instance of $Z_\theta$ depicted in the more general HSV input space diagram in FIG. 13. However, since the segments in FIG. 17 are in L*a*b* device-independent perceptual space they do represent the bounds of the maximum color gamut within the colorant limit. FIG. 17 is an orthographic projection perpendicular to the gamut volume represented in FIGS. 13 and 14.

Total Colorant Calculation

The utility function t(A) returns the total colorant used by a given color vector A. It is computed as the sum of all output channels used in A as a percentage of the unlimited output maximum ranging from 0 to 400% (for four channels).

Perceptual Color Difference Calculation

The utility function $d(A_1,A_2)$ returns a perceptually derived color difference between any two colors $A_1$ and $A_2$. In an exemplary embodiment, CIE ΔE can be used for this. $\Delta E(A_1,A_2)$ is a perceptual (device-independent) color difference between colors measured for $A_1$ and $A_2$. In one embodiment, the CIE76 CIELAB color difference metric defined as:

$$\Delta E^*_{ab}=\sqrt{(L^*_2-L^*_1)^2+(a^*_2-a^*_1)^2+(b^*_2-b^*_1)^2},$$

Illuminant D65 can be used to compute $\Delta E(A_1, A_2)$. However, other color-difference formulae can be used, such as $\Delta E^*_{94}$, $\Delta E^*_{00}$, and CMC l:c with other illuminants.

Such color differences can be used to scale planar projections from 3D perceptual color coordinates, as in interpolation within 2D hue leaves, described above, since the input hue is unmodified. In some cases, it may be more appropriate to describe color differences as distance in $(L^*, C^*)$ instead of $(L^*, a^*, b^*)$, for example. These may be computed as:

$$C_{ab}^* = \sqrt{a^{*2} + b^{*2}}$$

$$\Delta E^*_{C_{ab}} = \sqrt{(L^*_2 - L^*_1)^2 + (C_{ab_2}^* - C_{ab_1}^*)^2}$$

The computed perceptual color difference can be used to position the output reference color for more uniform sampling of the output space. This part of the process is independent of benefits, such as mapping maximum output gamut volume. Extremely precise measurement or calibration to an absolute standard is not required. Mutually consistent color values roughly corresponding to perceptual color differences on the output are sufficient. For example, a successful implementation of the current apparatus/method is based on color differences on the relative $\Delta E^*_{ab}$ difference from the darkest gray-line color D. Another implementation uses values measured on a different output device model with similar marking technology and colorant. The color difference formula need not be exact, as long as it captures relative perceptual differences. In some cases, a value based solely or predominantly on lightness difference for example may be sufficient. The CIE76 CIELAB color difference metric is more than adequate for this application.

The method illustrated in FIGS. 4 and 5 may be at least partially implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 4 and 5, can be used to implement the method. As will be appreciated, while the steps of the method may all be computer implemented, in some embodiments one or more of the steps may be at least partially performed manually.

The exemplary system and method provide some or all of the following benefits:

1. The method maximizes output gamut volume within colorant limits, e.g., increased CIELAB color gamut volume as noted above.
2. The method decouples output gamut volume from gray line under-color.
3. An output device specific color characterization, other than the ink limit, may optionally be provided for improved output linearization.
4. The method enables trade-offs between application specific parameters including color stability, colorant use, and image quality without sacrificing color gamut volume.
5. The method works well even when applied to pre-linearized, arbitrarily truncated or otherwise pre-modified device data.
6. The method can use conventional UCR/GCR curves for grey line adjustment, providing compatibility with prior methods and is easy to retrofit into existing color management systems.

The method finds particular application in graphic arts workgroup color printers, where an expansion in color gamut volume in L*a*b* color space allows creating dark chromatic shades unavailable without it. The present system and method provide significant improvement over existing methods. The system and method find application in many CMYK printing devices and associated software and can provide increases in gray-line stability and reduction in colored toner use by replacing the gray component with primarily black.

The system and method can be used as a replacement for black generation (UCR/GCR) used in digital CMYK color printers or as part of color management systems in device profiles for color printing and imaging devices.

The system and method can maximize color gamut volume and reduce and control colorant use in any CMYK printer without hardware or colorant change and at no performance cost. In most cases, it can be beneficially used even without output device specific customization or color measurements.

In addition to implementation in embedded printer firmware, the instructions can also be used in host or cloud-based software to create color separations and/or output device color profiles. Generally, any use of UCR/GCR (black generation) in any context may benefit from the disclosed method.

The disclosed system and method provide a black generation method converting device-dependent three-channel input color to four-channel output. The method is designed to maximize color gamut volume within arbitrary ink limits improving output device color without hardware modification or performance cost.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for generating device-dependent color values which satisfy a colorant limit for an output device, the method comprising:

for an input color defined by input values for respective color channels in a first device-dependent color space, converting the input values to a second device-dependent color space represented in cylindrical coordinates with hue angle and two other coordinates;

ranking the input values in the first device-dependent color space to identify a minimum one of the input values, a maximum one of the input values, and a middle one of the input values;

setting the minimum input value to zero;

adjusting the middle input value to maintain the input hue angle;

constructing a hue leaf based on the hue angle, the hue leaf describing a slice of an output color gamut which satisfies the colorant limit for the output device, the slice containing the input color;

partitioning the hue leaf into one or more regions;

identifying one of the regions of the hue leaf containing the input color;

interpolating the identified region within the hue leaf to identify intermediate values for the input color in a third device-dependent color space, the third device-dependent color space having a greater number of channels than the first device-dependent color space; and outputting output values in the third device-dependent color space, the output values being the intermediate values or output values derived therefrom.

2. The method of claim 1, wherein the first device-dependent color space is selected from an RGB color space and a CMY color space.

3. The method of claim 1, wherein the first device-dependent color space includes only three color channels and the third device-dependent color space includes at least four color channels.

4. The method of claim 1, wherein the third device-dependent color space includes a black channel.

5. The method of claim 1, wherein the second device-dependent color space is a cylindrical color space which includes a hue angle.

6. The method of claim 1, wherein the constructing of the hue leaf is also based on a set of predetermined output reference colors for the device.

7. The method of claim 6, wherein the predetermined output reference colors comprise:

W, which corresponds to $\{S,V\}=\{0, 1\}$ in the device-dependent color space,

K, which corresponds to maximum black colorant,

D, which corresponds to $\{S,V\}=\{0, 0\}$ in the second device-dependent color space, with third color space color;

$Z_\theta$, which corresponds to $\{S,V\}=\{1, 1\}$ in the second device-dependent color space, with third color space value corresponding to input value ranked as maximum at maximum colorant, third color space value corresponding to input value ranked as minimum with no colorant and no black colorant;

$zK_\theta$, which corresponds to $\{S,V\}=\{1, 0\}$ in the second device-dependent color space and third color space color with maximum black colorant K plus as much colorant mixture $Z_\theta$ as possible while staying within colorant limit T; and $Zk_\theta$, which is a third color space color with maximum colorant mixture $Z_\theta$ plus as much black colorant K as possible while staying within the colorant limit T.

8. The method of claim 7, wherein a first of the regions $R_1$ is bounded by four predetermined output color values W, $Z_\theta$, $Zk_\theta$, and K, a second of the regions $R_2$ is bounded by predetermined output color values K, $Zk_\theta$, and $zK_\theta$, and a third of the regions $R_3$ is bounded by predetermined output color values K, $zK_\theta$, and line D.

9. The method of claim 1, further comprising performing selective black exchange on the intermediate values in the third color space to generate the output values in the third color space.

10. The method of claim 1, wherein the output values are output to a print engine for printing an image with colorants, each colorant corresponding to one of the color channels of the third device-dependent color space.

11. The method of claim 1, wherein the constructing of the hue leaf, partitioning the hue leaf, identifying the region of the hue leaf, and interpolating the identified region are performed with a processor.

12. The method of claim 1, wherein the colorant limit specifies a maximum value of a sum of the intermediate values and/or the output values.

13. The method of claim 1, wherein the input color comprises a plurality of input colors, each of the plurality of input colors being associated with at least one pixel of an input image.

14. The method of claim 1, wherein the hue leaf encompasses only colorant values that are within the colorant limit for the output device.

15. The method of claim 1, wherein the hue leaf is first partitioned into two regions, at least one of the two regions being partitioned into at least two smaller regions if the respective one of the two regions has more than three vertices.

16. A computer program product comprising a non-transitory recording medium storing instructions, which when executed on a computer, cause the computer to perform the method of claim 1.

17. A system comprising memory which stores instructions for performing the method of claim 1, a processor, in communication with the memory, which executes the instructions., and optionally a print engine which renders the image on print media, based on the output values for a plurality of pixels of the input image.

18. The method of claim 1, wherein the second cylindrical device-dependent color space comprises a hue angle $\theta$, a saturation S, and a brightness value V.

19. The method of claim 1, wherein the hue angle $\theta$ in the second cylindrical color space corresponds to a perceived hue produced by an output device predetermined using colorant mixtures corresponding to the input or intermediate color.

20. An image rendering system comprising:

an intermediate color generator which, for each of a plurality of input colors defined by input values for respective color channels in a first device-dependent color space:

converts the input values to a hue angle $\theta$, a saturation S, and a brightness value V in a second device-dependent color space;

constructs a hue leaf based on the hue angle, the hue leaf describing a slice of an output color gamut which satisfies the colorant limit for an output device, the slice containing the input color, the hue leaf being bounded by connected vertices for output device reference color values W, K, D, $zK_\theta$, $Zk_\theta$, and $Z_\theta$, where:

W corresponds to $\{S,V\}=\{0, 1\}$ in the device-dependent color space,

K corresponds to maximum black colorant,

D is the determined darkest neutral color composed of C, M, Y, and K colorants, where $C+M+Y+K \leq T$, where T represents the colorant limit;

$Z_\theta$ corresponds to $\{S,V\}=\{1, 1\}$ in the second device-dependent color space at hue angle $\theta$, with the third color space value corresponding to input value ranked as maximum at maximum colorant, third color space value corresponding to input value ranked as minimum with no colorant and no black colorant;

$zK_\theta$ is a color at hue angle $\theta$ on the gamut surface equal to maximum K plus as much Max plus Mid in the ratio of $Z_\theta$ as possible up to $Z_\theta$ without exceeding T, $t(zK_\theta) \leq T$;

$Zk_\theta$ is a color at hue angle $\theta$ on the gamut surface equal to colorant mixture $Z_\theta$ composed of colorant Max plus Mid where Max is equal to it's maximum $Max_{max}$ plus as much black colorant K as possible without exceeding the colorant limit T, $(Zk_\theta) \leq T$;

partitions the hue leaf into interpolation regions, at least one of the interpolation regions having a non-zero size;

identifies one of the interpolation regions of the hue leaf containing the input color; and interpolates the identified interpolation region within the hue leaf to identify intermediate values for the input color in a third device-dependent color space, the third device-dependent color space having a greater number of channels than the first device-dependent color space; and an input device which receives an image to be rendered, the image comprising a plurality of pixels, each pixel being defined by input values in the first device-dependent color space;

an output device which outputs output values for the pixel in the third device-dependent color space, the output values being the intermediate values or output values derived therefrom; and a print engine which receives the output values and renders the image using at least four colorants, based on the output values.

21. The image rendering system of claim 20, further comprising a processor device which implements the intermediate color generator.

22. A method for generating device-dependent color values which satisfy a colorant limit for an output device, the method comprising:

for an input color defined by input values for respective color channels in a first device-dependent color space, converting the input values to a hue angle $\theta$, a saturation S, and a brightness value V in a second device-dependent color space;

constructing a hue leaf based on the hue angle, the hue leaf describing a slice of an output color gamut which satisfies the colorant limit for the output device, the slice containing the input color constructs a hue leaf based on the hue angle, the hue leaf describing a slice of an output color gamut which satisfies the colorant limit for an output device, the slice containing the input color, the hue leaf being bounded by connected vertices for output device reference color values W, K, D, $zK_\theta, Zk_\theta$, and $Z_\theta$, where:

W corresponds to $\{S,V\}=\{0,1\}$ in the device-dependent color space,

K corresponds to maximum black colorant,

D is the determined darkest neutral color composed of C, M, Y, and K colorants, where $C+M+Y+K \leq T$, where T represents the colorant limit;

$Z_\theta$ is a maximum chroma point in the hue leaf at hue angle $\theta$;

$zK_\theta$ is a color on the gamut surface at hue angle $\theta$ equal to maximum K plus as much Max plus Mid in the ratio of $Z_\theta$ as possible up to $Z_\theta$ without exceeding T, $t(zK_\theta) \leq T$;

$Zk_\theta$ is a gamut surface color at hue angle $\theta$ equal to colorant mixture $Z_\theta$ composed of colorant Max plus Mid where Max is equal to it's maximum $Max_{max}$ plus as much black colorant K as possible without exceeding the colorant limit T, $(Zk_\theta) \leq T$;

partitioning the hue leaf into interpolation regions, at least one of the interpolation regions having a non-zero size;

identifying the region of the hue leaf containing the input color;

interpolating the identified region within the hue leaf to identify intermediate values for the input color in a third device-dependent color space, the third device-dependent color space having a greater number of channels than the first device-dependent color space; and outputting output values in the third device-dependent color space, the output values being the intermediate values or output values derived therefrom.

* * * * *